United States Patent
Haghighat et al.

(10) Patent No.: US 10,644,919 B2
(45) Date of Patent: May 5, 2020

(54) MULTI-LENGTH ZT DFT-S-OFDM TRANSMISSION

(71) Applicant: IDAC HOLDINGS, INC., Wilmington, DE (US)

(72) Inventors: Afshin Haghighat, Ile-Bizard (CA); Erdem Bala, East Meadow, NY (US); Ananth Kini, East Norriton, PA (US); Alphan Sahin, Westbury, NY (US)

(73) Assignee: IDAC HOLDINGS, INC., Wilmington, DE (US)

( * ) Notice: Subject to any disclaimer, the term of this patent is extended or adjusted under 35 U.S.C. 154(b) by 7 days.

(21) Appl. No.: 15/769,938

(22) PCT Filed: Nov. 2, 2016

(86) PCT No.: PCT/US2016/060020
§ 371 (c)(1),
(2) Date: Apr. 20, 2018

(87) PCT Pub. No.: WO2017/079221
PCT Pub. Date: May 11, 2017

(65) Prior Publication Data
US 2018/0316537 A1    Nov. 1, 2018

Related U.S. Application Data

(60) Provisional application No. 62/326,555, filed on Apr. 22, 2016, provisional application No. 62/250,584, filed on Nov. 4, 2015.

(51) Int. Cl.
*H04L 5/00* (2006.01)
*H04J 11/00* (2006.01)
(Continued)

(52) U.S. Cl.
CPC ........ *H04L 27/2636* (2013.01); *H04L 5/0039* (2013.01); *H04L 5/0073* (2013.01); *H04B 1/38* (2013.01); *H04J 11/00* (2013.01)

(58) Field of Classification Search
CPC .............................. H04L 5/0039; H04L 1/00
(Continued)

(56) References Cited

U.S. PATENT DOCUMENTS

2008/0095040 A1    4/2008  Kwon et al.
2009/0122771 A1    5/2009  Cai
(Continued)

FOREIGN PATENT DOCUMENTS

WO         2015113594 A1    8/2015

OTHER PUBLICATIONS

Berardinelli et al., "On the Potential of Zero-Tail DFT-Spread-OFDM in 5G Networks," Proceedings of the IEEE Vehicular Technology Conference (VTC) (Sep. 2014).
(Continued)

*Primary Examiner* — Angel T Brockman
(74) *Attorney, Agent, or Firm* — Volpe and Koenig, P.C.

(57) ABSTRACT

Techniques may be used to generate a multi-length Zero Tail (ZT) Discrete Fourier Transform-spread Orthogonal Frequency Domain Modulation (DFT-s-OFDM) signal for transmission. A selected allocation of frequency resources may include a plurality of subbands. Subbands may be assigned to wireless transmit/receive units (WTRUs) (i.e., users), and zero head length and zero tail length may be assigned to each of the assigned subbands according to a pattern to combat inter-symbol interference (ISI). The ZT DFT-s OFDM signal may generated for transmission over the assigned subbands in accordance with the assigned zero head length and the assigned zero tail length.

18 Claims, 22 Drawing Sheets

(51) Int. Cl.
  *H04L 27/26*  (2006.01)
  *H04B 1/38*  (2015.01)
(58) Field of Classification Search
  USPC .......................................................... 370/329
  See application file for complete search history.

(56) References Cited

U.S. PATENT DOCUMENTS

| | | |
|---|---|---|
| 2009/0296645 A1 | 12/2009 | Bui |
| 2009/0304097 A1 | 12/2009 | Han et al. |
| 2010/0098177 A1* | 4/2010 | Hamaguchi ............ H04L 5/0007 375/260 |
| 2013/0017835 A1* | 1/2013 | Takahashi ............. H04W 72/04 455/450 |
| 2013/0070703 A1 | 3/2013 | Yasukawa et al. |
| 2014/0355626 A1 | 12/2014 | Fechtel |
| 2015/0071203 A1 | 3/2015 | Lee et al. |

OTHER PUBLICATIONS

Berardinelli et al., "On the Potential of OFDM Enhancements as 5G Waveforms,", Proceedings of the IEEE Vehicular Technology Conference (VTC Spring), pp. 1-5 (2014).
Berardinelli et al., "Zero-tail DFT-spread-OFDM signals," Globecom 2013 Workshop, pp. 229-234 (Dec. 9, 2013).

* cited by examiner

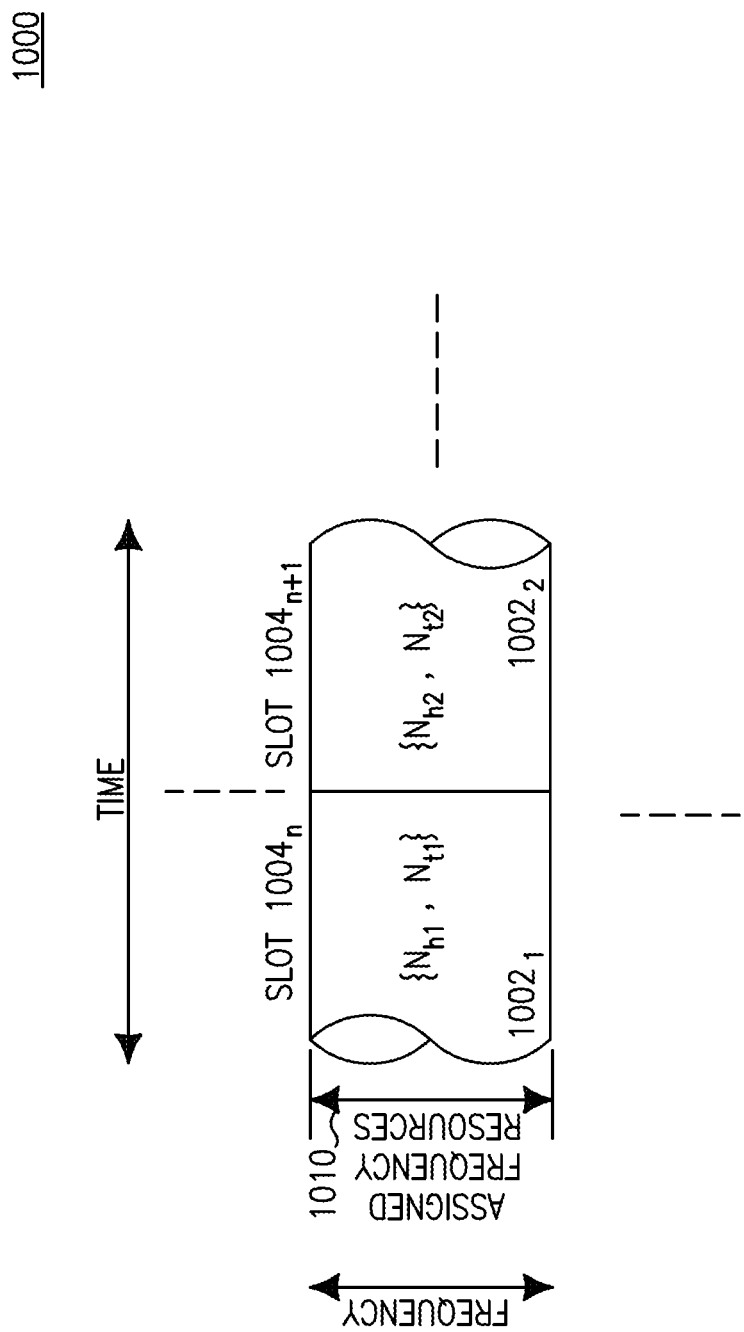

MULTI-LENGTH ZT DFT-S-OFDM TRANSMISSION

CROSS REFERENCE TO RELATED APPLICATIONS

This application is the U.S. National Stage, under 35 U.S.C. § 371, of International Application No. PCT/US2015/060020 filed Nov. 2, 2016, which claims the benefit of U.S. Provisional Patent Application Ser. No. 62/250,584, filed Nov. 4, 2015, and U.S. Provisional Patent Application Ser. No. 63/326,555, filed Apr. 22, 2016, which are incorporated by reference as if fully set forth.

SUMMARY

Techniques may be used to generate a multi-length Zero Tail (ZT) Discrete Fourier Transform-spread Orthogonal Frequency Domain Modulation (DFT-s-OFDM) signal for transmission. A selected allocation of frequency resources may include a plurality of subbands. Subbands may be assigned to wireless transmit/receive units (WTRUs) (i.e., users), and zero head length and zero tail length may be assigned to each of the assigned subbands according to a pattern to combat inter-symbol interference (ISI). The ZT DFT-s OFDM signal may generated for transmission over the assigned subbands in accordance with the assigned zero head length and the assigned zero tail length.

BRIEF DESCRIPTION OF THE DRAWINGS

A more detailed understanding may be had from the following description, given by way of example in conjunction with the accompanying drawings wherein:

FIG. 10 shows an assignment diagram of an example time-varying frequency resource assignment for a multi-length ZT DFT-s-OFDM signal;

DETAILED DESCRIPTION

Embodiments described herein may include methods, systems, and apparatuses that allow for the coexistence of users with different guard times under a fixed numerology for an overall cellular system. As such, a signal intended for each user may adopt different guard times per subband, which may be different from other users in the system. This may reduce unnecessary overhead and lead to an enhancement in the overall throughput of the system.

Figure 1A:
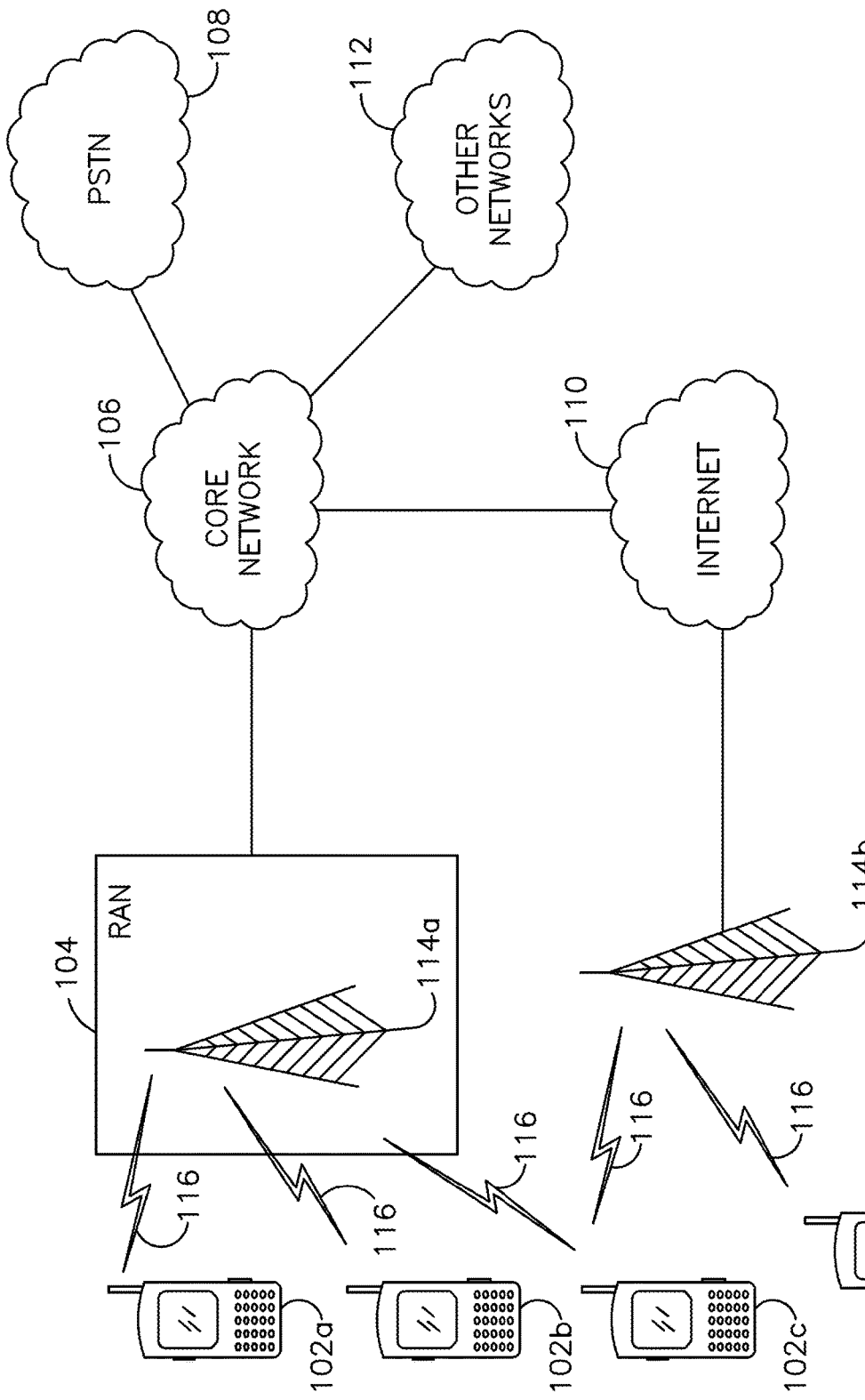
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) (e.g., as described by the Third Generation Partnership Program (3GPP)).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
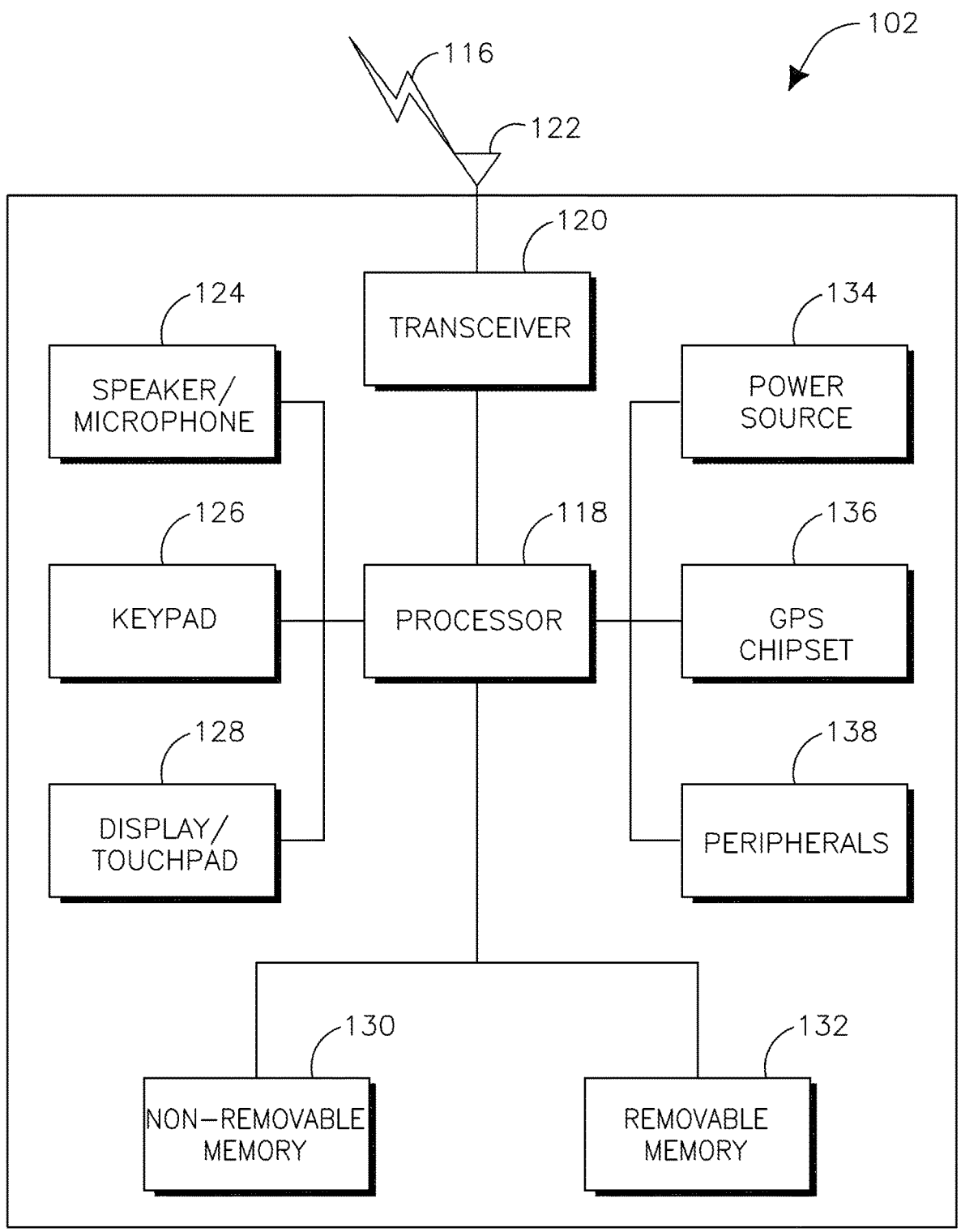
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
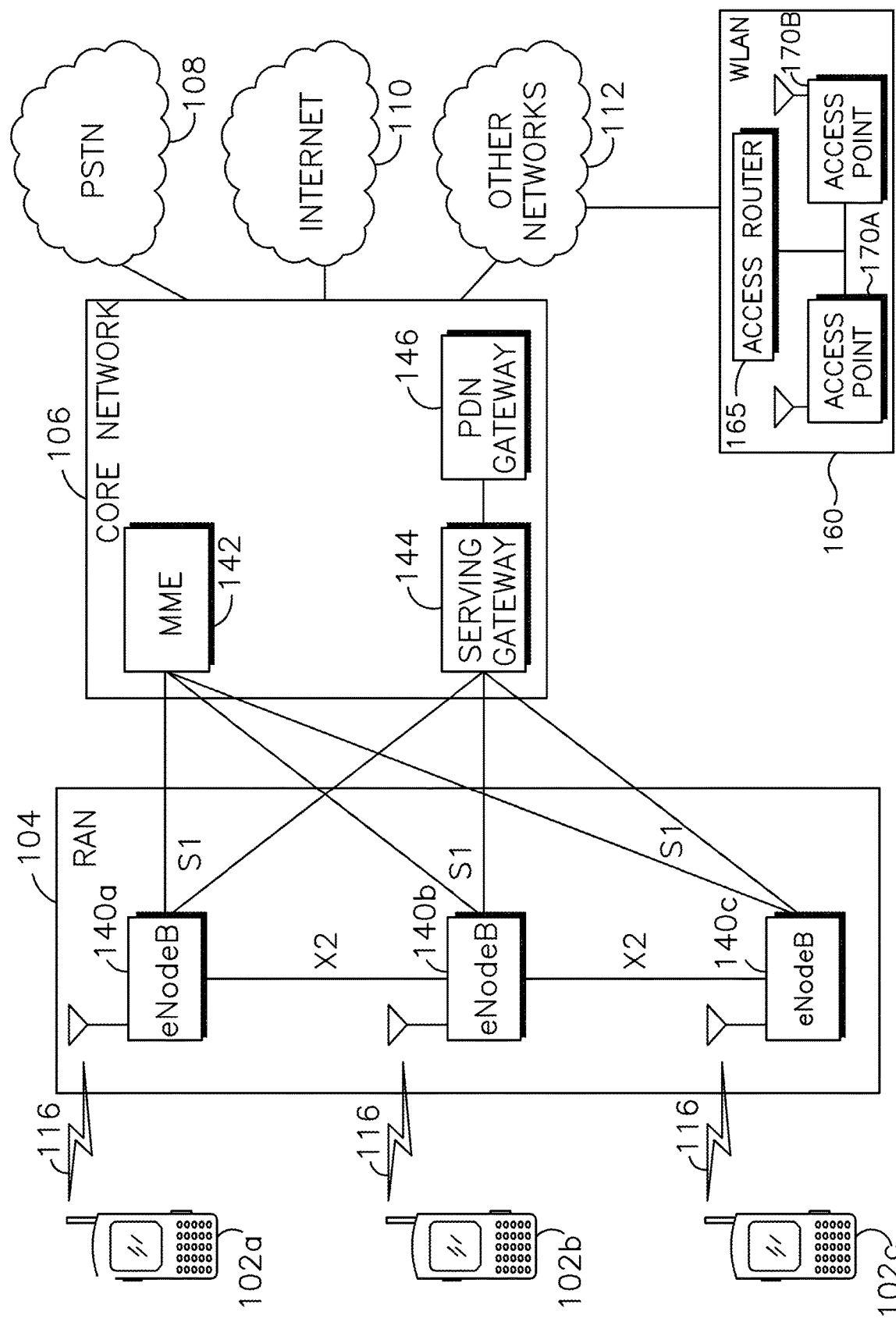
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management entity gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

The others network 112 may further be connected to an IEEE 802.11 based wireless local area network (WLAN) 160. The WLAN 160 may include an access router 165. The access router may contain gateway functionality. The access router 165 may be in communication with a plurality of access points (APs) 170a, 170b. The communication between access router 165 and APs 170a, 170b may be via wired Ethernet (IEEE 802.3 standards), or any type of wireless communication protocol. AP 170a is in wireless communication over an air interface with WTRU 102d.

In a cellular system, WTRUs (i.e., users) may experience different channel delay profiles of received signals according to their locations, allocated frequency resources, and/or mobility modes. Cyclic prefix (CP) is an example error protection technique used in telecommunications where information appearing at the prefix of a symbol is replicated at the suffix of the symbol. It may be used to simplify frequency-domain processing (e.g., channel estimation and equalization) and/or provide a guard interval to reduce or eliminate inter-symbol interference (ISI), for example. The size of the CP is a critical parameter, such that a bigger CP may be more effective at reducing ISI but increases overhead and delay. In the examples described herein, user may be used interchangeably with WTRU.

In an example, in an LTE-based cellular system, the CP size may be adjusted based on the worst channel delay spread of a given cell. In this case, signals sent to and received from all the WTRUs (i.e., users) in the system may be based on a fixed CP size. The CP size may be a cell-specific parameter and a WTRU may need to know the CP size for downlink (DL) and/or uplink (UL) reception and/or transmission. In some LTE-based systems, it may not be possible to adjust the CP size according to a given user (i.e., WTRU) profile. This may lead to some waste in transmit power as well as time/frequency resources.

Figure 2:
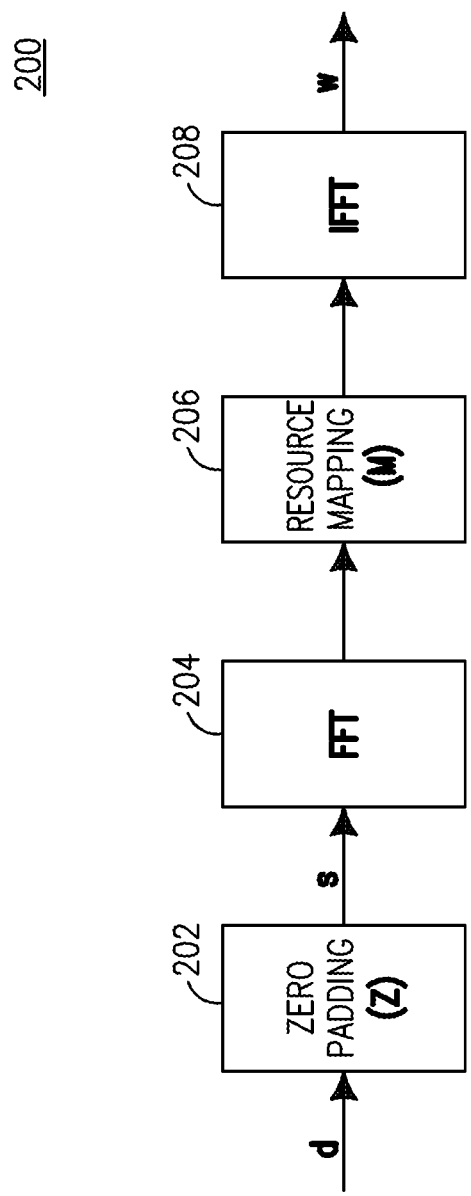
FIG. 2 shows a block diagram of an example system for generating a Zero Tail (ZT) Discrete Fourier Transform-spread Orthogonal Frequency Domain Modulation (DFT-s-OFDM) signal.

Zero Tail (ZT) Discrete Fourier Transform-spread Orthogonal Frequency Division Multiplexing (DFT-s-OFDM) schemes for digital multi-carrier modulation are among the waveform candidates for next generation wireless systems. FIG. 2 shows a block diagram of an example system 200 for generating a ZT DFT-s-OFDM signal w, which may be transmitted by a transmitter in an LTE system. The example system 200 may include, but is not limited to include, any of the following elements: a zero-padding (Z) block 202, a Fast Fourier Transform (FFT) block 204 (the FFT block 204 may perform a discrete Fourier transform (DFT) operation); a resource mapping (M) block 206; and/or an Inverse FFT (IFFT) block 208.

For a given transmit data vector $d_{L \times 1}$ with length L, a ZT DFT-s-OFDM signal w may be generated as follows:

$$w = F_{N_{IFFT}}^{-1} M F_{N_{FFT}} s, \qquad \text{Equation (1)}$$

where $s = [0_{N_h}\ d_{L \times 1}\ 0_{N_t}]^T$ is the zero-padded transmit data vector generated by applying zero-padding block (Z) 202 to input data vector d to add a zero padding of length $N_h$ to the head of the data vector $d_{L \times 1}$ and a zero padding of length $N_t$ to the tail of the data vector $d_{L \times 1}$; $F_{N_{FFT}}$ is the Fast Fourier Transform (FFT) matrix with size $N_{FFT}$ applied to signal s at FFT block 204; M is the resource mapping matrix with dimension $N_{IFFT} \times N_{FFT}$ applied at resource mapping block 206 to assign subbands; and $F_{N_{IFFT}}^{-1}$ is the inverse FFT (IFFT) matrix with size $N_{IFFT}$ applied at IFFT block 208.

The matrix $0_N$ represents an all-zero vector with length N. Indices $N_h$ and $N_t$ represent the number of zeros padded to the head and tail, respectively, of the data vector d, where $N_{FFT} = N_h + N_t + L$. The resource mapping matrix M has the following structure, where the identity matrix $I_{N_{FFT}}$ may be mapped anywhere along the vertical column:

$$M = \begin{bmatrix} 0 \\ I_{N_{FFT}} \\ 0 \end{bmatrix}_{N_{IFFT} \times N_{FFT}} \qquad \text{Equation (2)}$$

Figure 3A:
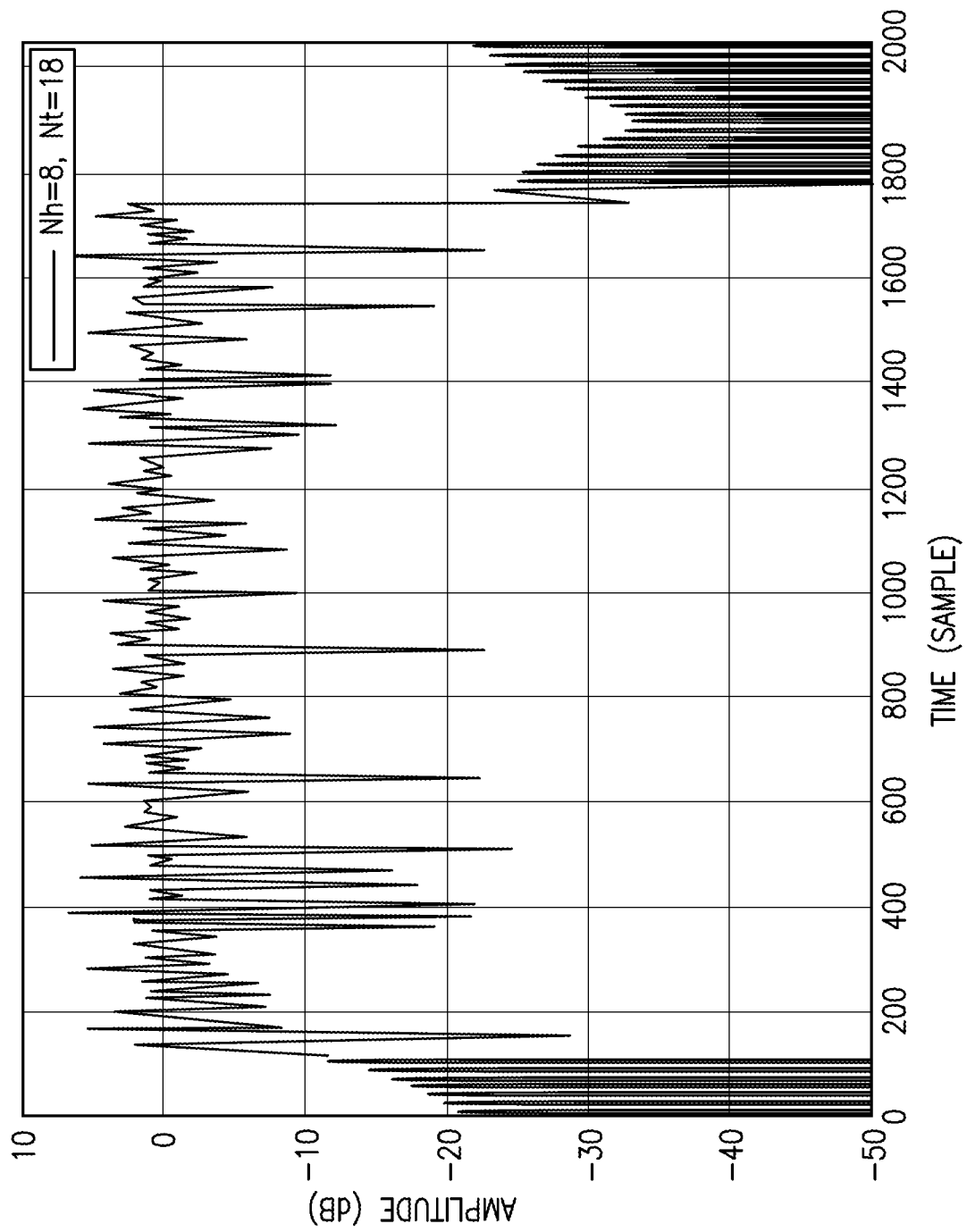
FIGS. 3A and 3B show graphs of time domain representations of ZT DFT-s-OFDM signals with different head and tail zero padding sizes.
Figure 3B:
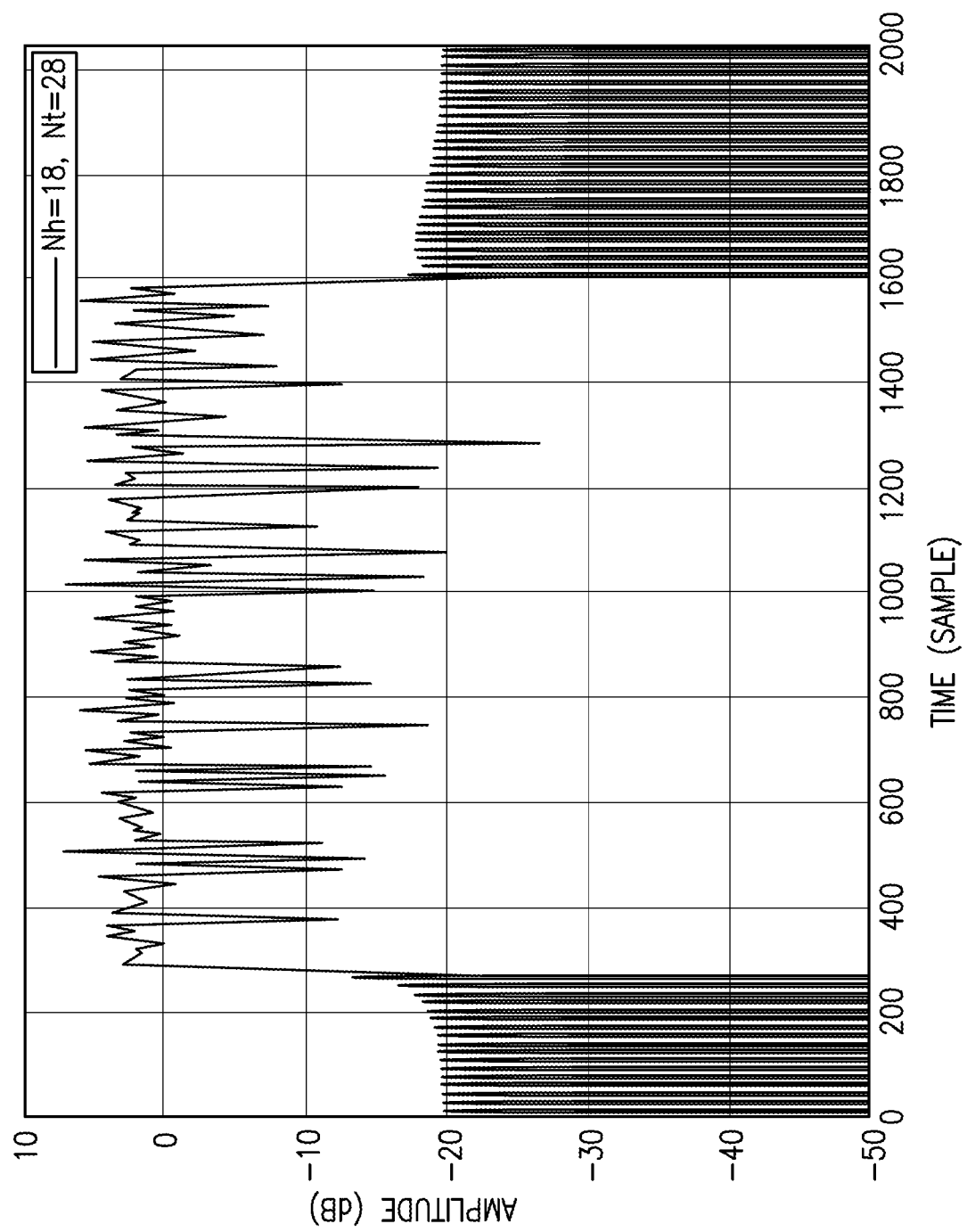

FIGS. 3A and 3B show graphs of time domain representations of ZT DFT-s-OFDM signals with different head and tail zero padding sizes. The time domain representations of the ZT DFT-s-OFDM signal show the amplitude in Decibels (dB) over time. $N_h$ may be the number of zeros padded at the head of the ZT DFT-s-OFDM signal and $N_t$ may be the number of zeros padded at the tail of the ZT DFT-s-OFDM signal. $N_h$ may be referred to as the zero head (padding) size or equivalently the zero head (padding) length. Similarly, $N_t$ may be referred to as the zero tail (padding) size or equivalently the zero tail (padding) length.

In FIG. 3A, the head zero padding size is $N_h = 8$, and the tail zero padding size is $N_t = 18$. In FIG. 3B, the head zero padding size is $N_h = 18$, and the tail zero padding size is $N_t = 28$. By varying the size of $N_h$ and $N_t$, the length of head and tail zeros in the time domain may be adjusted. Similar to the application of CP in an OFDM-based system, the zero tail (ZT) may be used to support transmission in multipath channels. The length of the head zeros $N_{wh}$ and tail zeros $N_{wt}$ of the time domain signal w may be determined as $N_{wh} = \lfloor N_h N_{IFFT}/N_{FFT} \rfloor$ and $N_{wt} = \lfloor N_t N_{IFFT}/N_{FFT} \rfloor$, respectively. As a result of this process, the output signal w may be written as:

$$w_{1 \times N_{IFFT}} = [\varepsilon_{N_{wh}} \omega_{N_{FFT} \times 1} \sigma_{N_{wt}}]^T, \quad \text{Equation (3)}$$

where parameters $\varepsilon_{N_{wh}}$ and $\sigma_{N_{wt}}$ are assumed to be negligible, and the vector $\omega_{N_{FFT} \times 1}$ represents the information or data vector.

The notation and definitions used in FIGS. 2, 3A and 3B are used and defined similarly in the examples described hereinafter.

In an example LTE-based system, CP size may be adjusted based on the worst channel delay spread of a given cell. Therefore, the signal sent to, and received from, all the WTRUs in the system may be based on a fixed CP size. Hence, in such LTE-based systems, it may not be possible to adjust the CP size according to a given user (WTRU) profile. This may lead to some waste in transmit power as well as time/frequency resource usage.

According to example approaches described herein, using Multi-Length ZT DFT-s-OFDM transmissions, each WTRU may be assigned a different size of head/tail zero padding according to their channel delay profile and the scheduled resources. This capability may allow WTRUs with shorter zero tail requirement to employ the spared resources to receive more information resulting in higher system throughput.

In an example approach, a subband based multi-length ZT DFT-s-OFDM transmission may be used by a single WTRU (user). In an example, it may be assumed that the ZT DFT-s-OFDM transmitter output signal is represented as $w = F_{N_{IFFT}}^{-1} g$, where $g = MF_{N_{FFT}} s$ (recall from the description of FIG. 2 that $F_{N_{FFT}}$ is the FFT matrix with size $N_{FFT}$, M is the resource mapping matrix with dimension $N_{IFFT} \times N_{FFT}$, and $F_{N_{IFFT}}^{-1}$ is the IFFT matrix with size $N_{IFFT}$). Therefore, each element of the vector w may be evaluated as:

$$w(n) = \frac{1}{\sqrt{N_{IFFT}}} \sum_{k=0}^{N_{IFFT}} g(k) e^{j \frac{2\pi nk}{N_{IFFT}}}. \quad \text{Equation (4)}$$

Since each user (WTRU) may be assigned a specific amount of frequency resources as specified by the selection matrix M, elements of g may be categorized as:

$$g(k) = \begin{cases} \neq 0 & k_0 \leq k \leq (k_0 + N_{FFT} - 1) \\ = 0 & \text{otherwise} \end{cases}, \quad \text{Equation (5)}$$

where, assuming a contiguous frequency resource assignment, $k_0$ is the index of the first assigned frequency resource. Therefore, w(n) may be rewritten as follows:

$$w(n) = \frac{1}{\sqrt{N_{IFFT}}} \sum_{k=k_0}^{k_0 + N_{FFT} - 1} g(k) e^{j \frac{2\pi nk}{N_{IFFT}}}. \quad \text{Equation (6)}$$

Assuming a multipath channel, the delay profile h(n) may be defined as:

$$h(n) = h_0 \delta(n) + \sum_{i=1}^{P-1} h_i \delta(n - \tau_i)$$

where $h_i = |h_i| e^{j\phi_i}$ and $\tau_i$ are amplitude and delay amounts for the $i_{th}$ path, respectively, and $\delta(n)$ is a dirac delta function. Then, the received signal r(n) may be expressed as:

$$r(n) = w(n) * h(n) \quad \text{Equation (7)}$$
or
$$r(n) = h_0 w(n) + \quad \text{Equation (8)}$$
$$\left( \frac{1}{\sqrt{N_{IFFT}}} \sum_{k=k_0}^{k_0 + N_{FFT} - 1} g(k) e^{j \frac{2\pi nk}{N_{IFFT}}} \right) * \left( \sum_{i=1}^{P-1} |h_i| e^{j\phi_i} \delta(n - \tau_i) \right)$$

that may be further simplified with some basic manipulations, as follows:

$$r(n) = h_0 w(n) + \frac{1}{\sqrt{N_{IFFT}}} \sum_{k=k_0}^{k_0 + N_{FFT} - 1} g(k) e^{j \frac{2\pi nk}{N_{IFFT}}} \sum_{i=1}^{P-1} |h_i| e^{j\left(-\frac{2\pi \tau_i k}{N_{IFFT}} + \phi_i\right)} \quad \text{Equation (9)}$$

$$= h_0 w(n) + \frac{1}{\sqrt{N_{IFFT}}} \sum_{k=0}^{N_{FFT}-1} g(k) e^{j \frac{2\pi n(k_0+k)}{N_{IFFT}}} \sum_{i=1}^{P-1} |h_i| e^{j\left(-\frac{2\pi \tau_i k}{N_{IFFT}} - \frac{2\pi \tau_i k_0}{N_{IFFT}} + \phi_i\right)} \quad \text{Equation (10)}$$

$$= h_0 w(n) + \frac{1}{\sqrt{N_{IFFT}}} \sum_{k=0}^{N_{FFT}-1} g(k) e^{j \frac{2\pi n(k_0+k)}{N_{IFFT}}} \sum_{i=1}^{P-1} |h_i| e^{j\left(-\frac{2\pi \tau_i k}{N_{IFFT}} + \hat{\phi}_i\right)}, \quad \text{Equation (11)}$$

where $$\hat{\phi}_i = -\frac{2\pi \tau_i k_0}{N_{IFFT}} + \phi_i.$$

Based on the above derivation in Equations (1)-(11), for a WTRU (user) assigned to resources defined by $\mathcal{N}: n_0 \leq n \leq (n_0 + N_{FFT} - 1)$, a few example cases of interest may be identified that are discussed in the following.

In an example scenario, if for all paths $i = 1, 2, \ldots, P-1$, the phase argument satisfies the following:

$$\frac{2\pi\tau_i k}{N_{IFFT}} << |\phi_i|, \qquad \text{Equation (12)}$$

or if for the range defined by $\mathcal{N}$: $n_0 \leq n \leq (n_0+N_{FFT}-1)$, the following term is approximately constant:

$$\sum_{i=1}^{P-1} |h_i| e^{j\left(-\frac{2\pi\tau_i k}{N_{IFFT}}+\phi_i\right)} \approx ct., \qquad \text{Equation (13)}$$

where ct. is an abbreviation for constant value. Then the observed multipath fading for this WTRU (user) translates to a flat fading channel, where the signal r(n) received by this WTRU may be defined as follows:

$$r(n) \approx h_0 w(n) + \frac{\gamma}{\sqrt{N_{IFFT}}} \sum_{k=k_0}^{k_0+N_{FFT}-1} g(k) e^{j\frac{2\pi n k}{N_{IFFT}}} = \left(h_0 + \frac{\gamma}{\sqrt{N_{IFFT}}}\right) w(n), \qquad \text{Equation (14)}$$

where γ is a complex constant. Therefore, the ZT DFT-s-OFDM transmitted signal scheduled in $\mathcal{N}$ may not require a zero head/tail as a guard time for protection against multipath, or at the least its length can be very short.

In another example scenario, in case either condition in Equations (12) and (13) stated above is only partially met, that is to say, if for any subset of signal paths $i \in \{1, 2, \ldots, P-1\}$:

$$\frac{2\pi\tau_i k}{N_{IFFT}} << |\phi_i|, \text{ or} \qquad \text{Equation (15)}$$

$$\sum_{i \in \{1,2,\ldots,P-1\}} |h_i| e^{j\left(-\frac{2\pi\tau_i k}{N_{IFFT}}+\phi_i\right)} \approx ct., \qquad \text{Equation (16)}$$

then the terms related to the complying paths may be factored out to represent a corresponding flat fading effect. Hence, the remaining paths (i.e., non-complying) may become the main cause for a multipath fading, and they may need to be considered for the guard time determination.

Thus, in this example case, for the frequency resources defined by $\mathcal{N}$, the requirement for guard time length may be relaxed. In other words, instead of determining the guard time length based on the entire set of amplitude $h_i$ and delay $\tau_i$ pairs for the paths $1 \leq i \leq P-1$:

$$\{(h_1,\tau_1),(h_2,\tau_2),\ldots,(h_{P-1},\tau_{P-1})\}, \qquad \text{Equation (17)}$$

the guard time may be defined only based on a subset of the amplitude $h_i$ and delay $\tau_i$ pairs:

$$\{(h_i,\tau_i)\} \exists i, i \in \{1,2,\ldots,P-1\}, \qquad \text{Equation (18)}$$

thus relaxing the requirement for the guard time length.

In an example, a WTRU may be configured to use the same $(N_h, N_t)$ parameters for demodulating and decoding of all of its payloads across the band. In another example, a WTRU may be configured to have different $(N_{h_i}, N_{t_i})$ parameters for demodulation and decoding of a payload transmitted on the $i^{th}$ subband.

Figure 4:
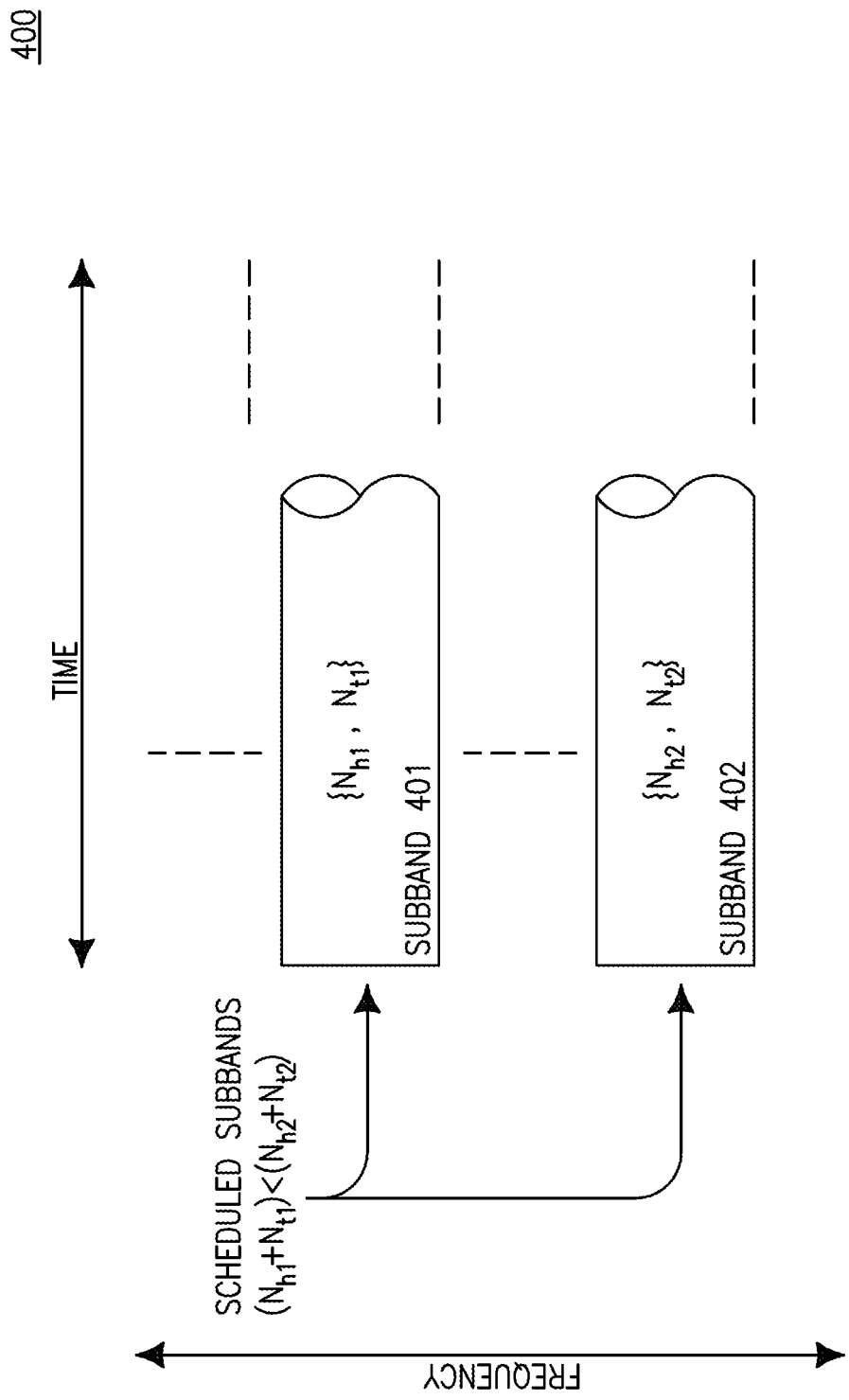
FIG. 4 shows an assignment diagram of an example subband assignment for the same WTRU, where different subbands assigned to the WTRU have different zero head and/or tail sizes.

FIG. 4 shows an assignment diagram of an example subband assignment 400 for the same WTRU, where different subbands assigned to the WTRU have different zero head and/or tail sizes. In the example subband assignment 400, subband 401 has a zero head and zero tail size assignment of $\{N_{h1}, N_{t1}\}$ and subband 402 has a zero head and zero tail size assignment of $\{N_{h2}, N_{t2}\}$ where $(N_{h1}+N_{t1})<(N_{h2}+N_{t2})$. The opportunity of adopting different guard times (i.e., different zero head/tail sizes) for different subbands may grow as the system bandwidth increases.

FIG. 4 shows a use case where two different subbands assigned to the same WTRU adopt different sizes of head/tail zero length. In an OFDM or ZT DFT-s-OFDM system, since both subbands 401 and 4022 belong to the same WTRU, and experience the multipath channel, then the delay profile h(n) may be defined as:

$$h(n) = h_0 \delta(n) + \Sigma_{i=1}^{P-1} h_i \delta(n-\tau_i), \qquad \text{Equation (19)}$$

where the guard time requirement for all subbands may be defined based on the entire set of $\{(h_1, \tau_1), (h_2, \tau_2), \ldots, (h_{P-1}, \tau_{P-1})\}$. However, it may be possible that the ZT DFT-s-OFDM signal for the subband 1 would require a shorter guard time than what is needed for the subband 2. For this example, since $(N_{h1}+N_{t1})<(N_{h2}+N_{t2})$, the overall overhead for head/tail zeroes may be reduced, thus making it possible to increase the data payload and increase the overall throughput.

Figure 5A:
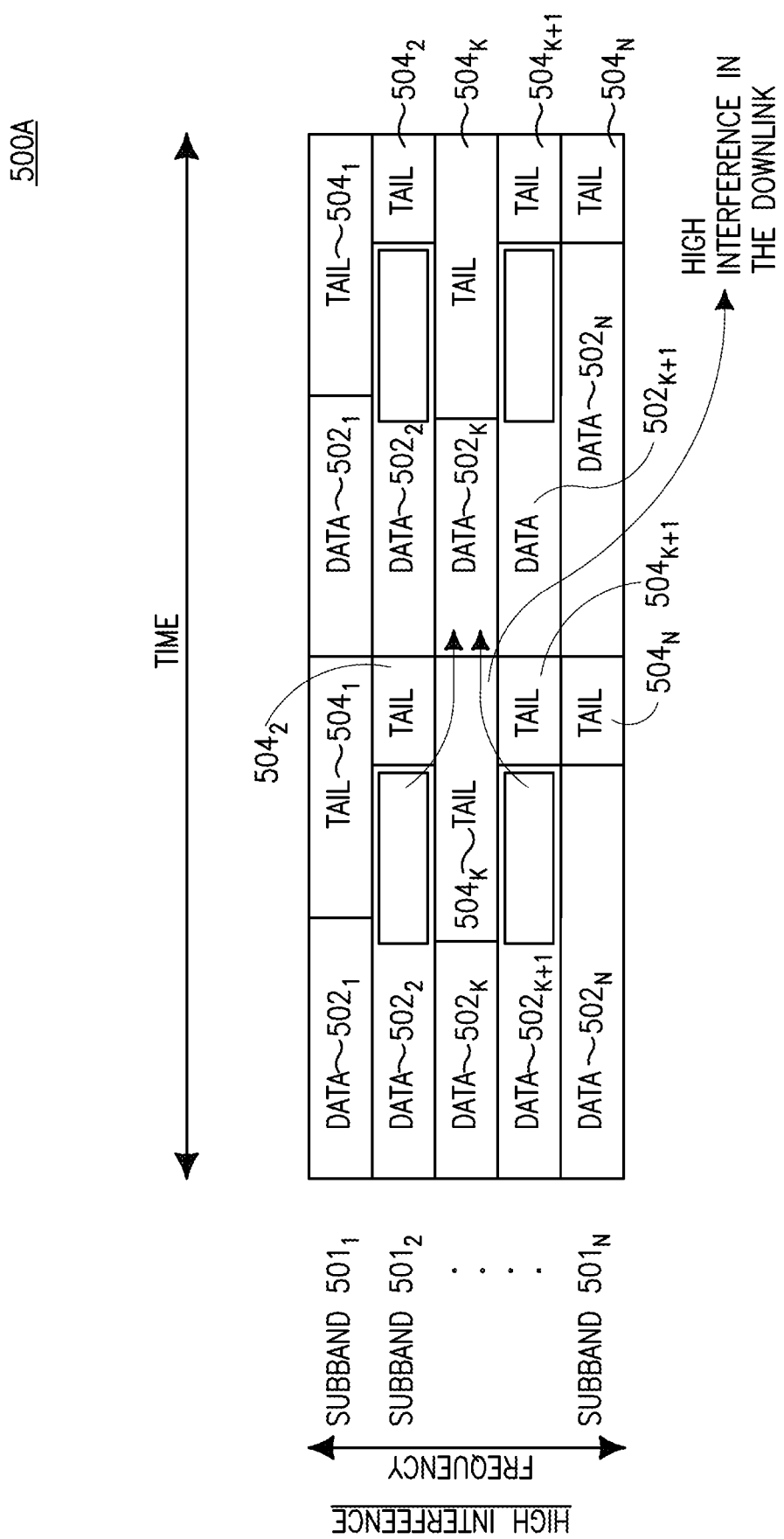
FIGS. 5A and 5B show configuration diagrams of example subband configurations for N subbands in a DL transmission.
Figure 5B:
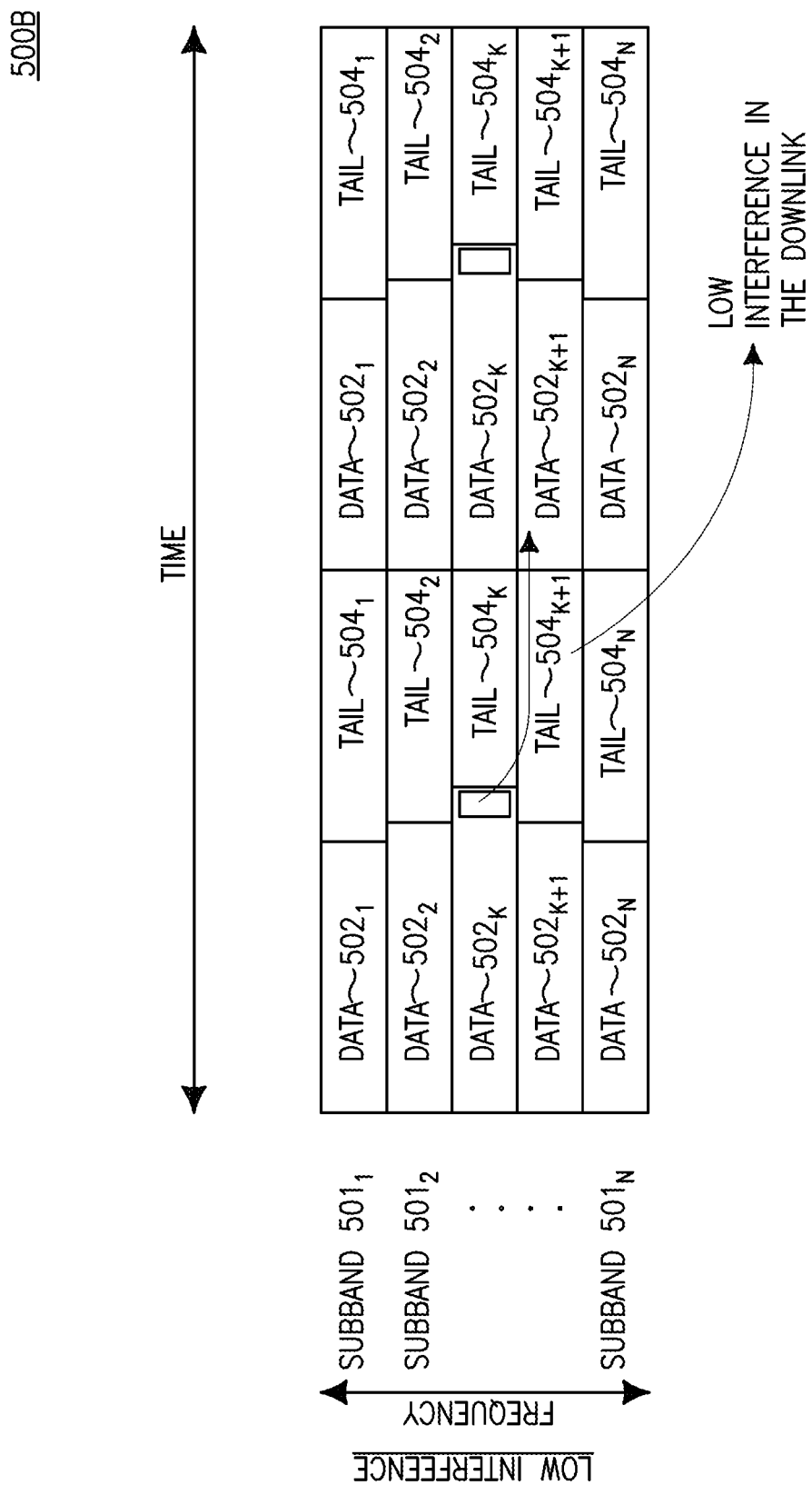

FIGS. 5A and 5B show configuration diagrams of example subband configurations 500A and 500B, respectively, for N subbands in a DL transmission. The example subband configurations 500A and 500B may similarly be used in the UL. Each subband $501_1$ to $501_N$ in the example subband configurations 500A and 500B may include corresponding data regions $502_1$ to $502_N$ and corresponding zero tail regions $504_1$ to $504_N$, respectively (other regions, not shown, may also be included). The zero tail regions $504_1$ to $504_N$ of the subbands $501_1$ to $501_N$ may be configured with a certain pattern across the subbands $501_1$ to $501_N$ in order to combat ISI in the downlink. For example, the sizes of the zero tail regions $504_1$ to $504_N$ for some or all of the subbands $501_1$ to $501_N$ may be gradually changed or may differ from one another. With this approach, WTRUs having similar channel delay profiles may be assigned to adjacent subbands (e.g., adjacent subbands $501_1$ and $501_2$), because the inter-subband interference between the WTRUs may be mitigated.

The example subband configuration 500A in FIG. 5A shows a high interference scenario, where the size of the zero tail $504_2$ in subband $501_2$ and the size of the zero tail $504_{k+1}$ in subband $501_{k+1}$ are equal. Because the size of the zero tail $504_2$ in subband $501_2$ equals the size of the zero tail $504_{k+1}$ in subband $501_{k+1}$, the data at the end of data region $502_2$ in subband $501_2$ and the data at the end of data region $502_{k+1}$ in subband $501_{K+1}$ may experience inter-subband interference with respect to each other. Moreover, it the zero tail sizes $504_2$, $504_{K+1}$, and $504_N$ for subbands $501_2$, $501_{K+1}$ and $501_N$, respectively, are not long enough, then there may be a significant ISI for each subband $501_2$, $501_{K+1}$ and $501_N$.

The example subband configuration 500B in FIG. 5B shows a low interference scenario, where the sizes of the zero tails $504_1$ to $504_N$ in subbands $501_1$ to $501_N$ are gradually changing from one adjacent subband to the next, which helps mitigate inter-subband interference. The lengths of the zero tails $504_1$ to $504_N$ may be gradually increasing or decreasing according to what is needed per subband $501_1$ to $501_N$.

Figure 6:
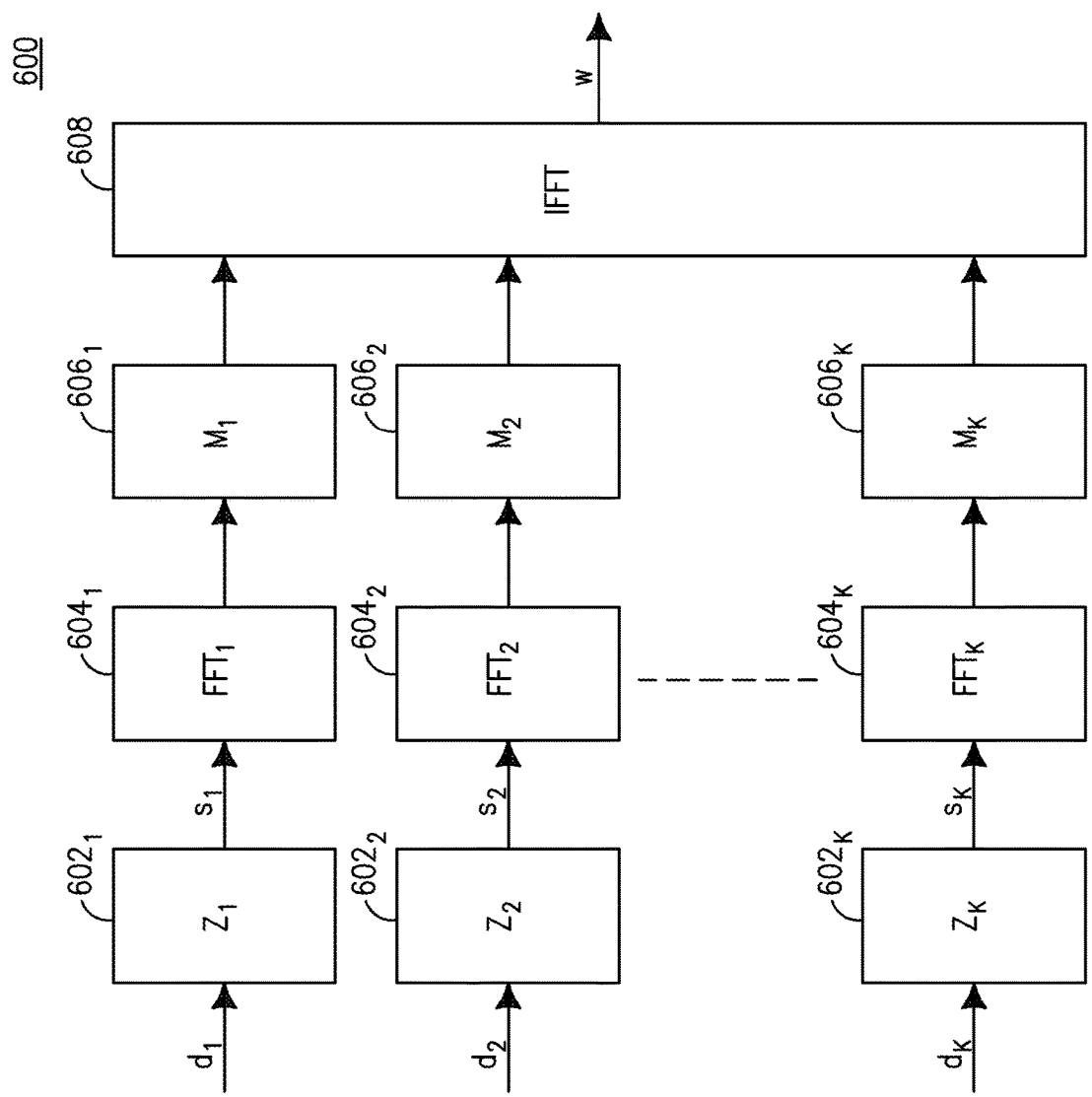
FIG. 6 shows a block diagram of an example system for generating a multi-length ZT DFT-s-OFDM multi-user signal.

In another example, a transmitter system may be designed, similarly to the example system 200 for generating a ZT DFT-s-OFDM signal in FIG. 2, but to generate multi-user ZT DFT-s-OFDM transmission signals. FIG. 6 shows a block diagram of an example system 600 for generating a multi-length ZT DFT-s-OFDM multi-user signal w. The multi-length ZT DFT-s-OFDM multi-user signal w may be transmitted by a transmitter in an LTE-system, for example. The example system 600 may include, but is not limited to include, any of the following elements for K users (WTRUs): zero-padding ($Z_1 \ldots Z_K$) blocks $602_1 \ldots 602_K$; FFT blocks $604_1 \ldots 604_K$; resource mapping ($M_1 \ldots M_K$) blocks $606_1 \ldots 606_K$; and/or an IFFT block 608.

Using the example system 600, each of the K users (WTRUs) may be assigned a different size of head and/or tail zeros according to their respective channel delay profiles. This capability allows WTRUs with a shorter zero tail requirement to use the spared resources to receive more information, resulting in higher system throughput. Moreover, the length of the transmitted symbols for all K WTRUs may be maintained at $N_{IFFT}$ samples.

In FIG. 6, the transmitted multi-user signal w may be expressed as:

$$w = F_{N_{IFFT}}^{-1} \sum_{k=1}^{K} M_k F_{N_{FFT_k}} s_k, \quad \text{Equation (20)}$$

where $s_k$ is the $k^{th}$ WTRU zero-padded transmit data vector, $$F_{N_{FFT_k}}$$

is the $k^{th}$ WTRU FFT matrix of size $N_{FFT_k}$, and $M_k$ is the $k^{th}$ WTRU resource mapping matrix of size $N_{IFFT} \times N_{FFT_k}$. As indicated, each WTRU may employ different lengths for the head zeroes and the tail zeroes, and therefore $$s_k = \begin{bmatrix} 0_{N_{h_k}} & d_{L_k \times 1} & 0_{N_{t_k}} \end{bmatrix}^T$$

where $d_{L_k \times 1}$ is the transmit data vector for the $k^{th}$ WTRU. The resource mapping matrices, $M_k$'s, may represent orthogonal resource assignments. Accordingly, when $k \neq j$, $M_k^T M_j = 0$.

As a result of the system 600, at the receiver, each WTRU may extract its own signal $\hat{s}_k$ without interference, and proceed with the remaining steps for the data detection. The receiver processing may be outlined as follows, where the $k^{th}$ WTRU receives signal $\hat{s}_k$:

$$\hat{s}_k = F_{N_{FFT_k}}^{-1} M_k^T F_{N_{IFFT}} w, \quad \text{Equation (21)}$$

from which an estimate of the transmitted data vector $\hat{d}_k$ may be extracted, assuming prior knowledge of values of the number of head zeros $N_h$ and the number of tail zeros $N_t$.

Figure 7A:
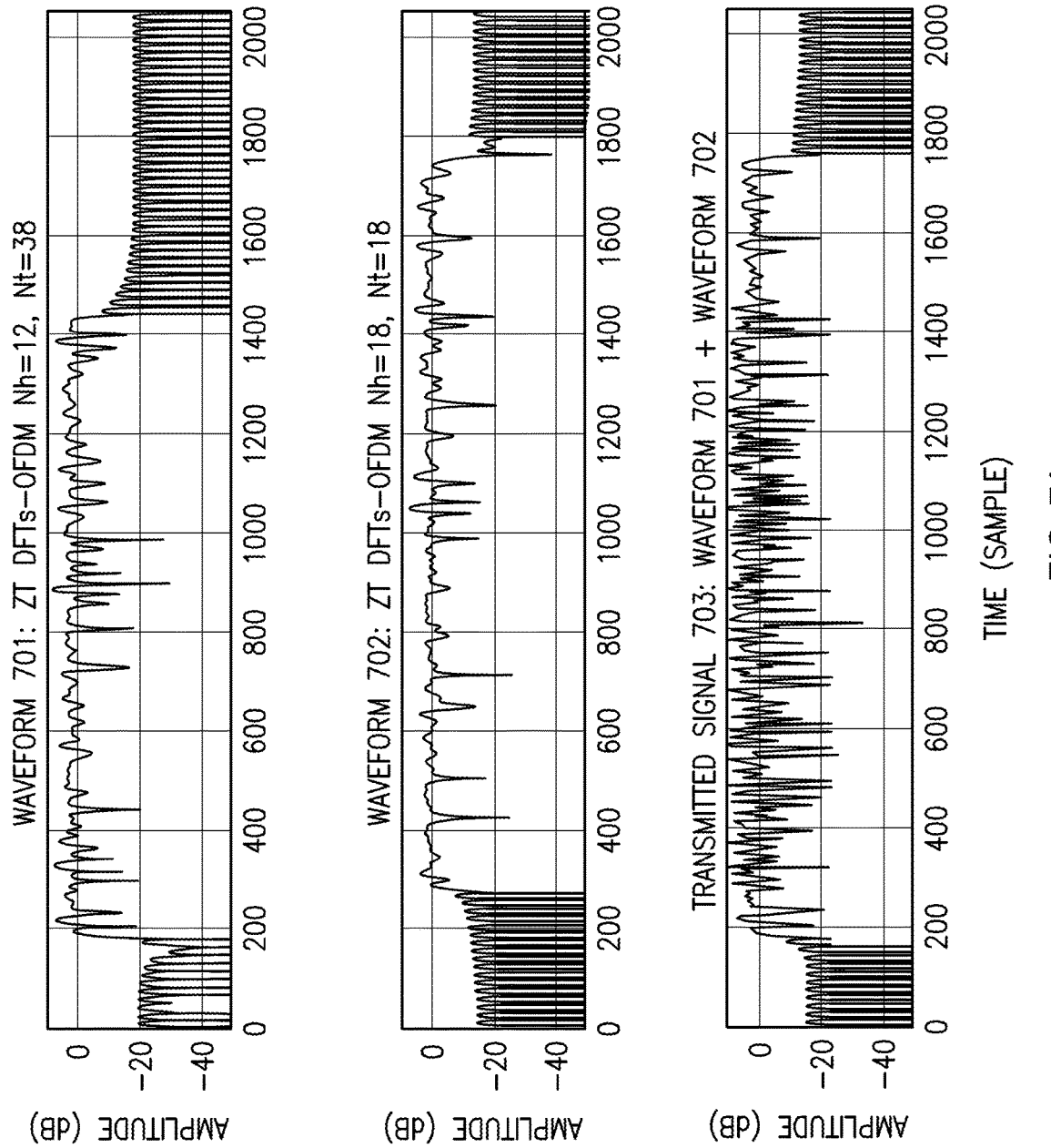
FIG. 7A shows a graph of a time domain representation of a ZT DFT-s-OFDM signal for a simulated two-user system with different head and tail zero padding size parameters.

FIG. 7A shows a graph of a time domain representation of a ZT DFT-s-OFDM signal 703 for a simulated two-user system with different head and tail zero padding size parameters. FIG. 7A shows the effective transmitted waveform 703 in a multi-user ZT DFT-s-OFDM system for two WTRUs with different sets of head and tail size (length) parameters. The top waveform shows waveform 701 for a first WTRU with $N_h=12$ and $N_t=38$; the middle waveform shows waveform 702 for a second WTRU with $N_h=18$ and $N_t=18$; and the third waveform shows the transmitted signal 703 as a combination of waveforms 701 and 702 for the two WTRUs. The lengths (sizes) of head and tail zeros of the effective transmitted signal 703 may be determined by smallest values of $N_h$ and $N_t$ of waveforms 701 and 702 for the two WTRUs, as shown in FIG. 7A.

Figure 7B:
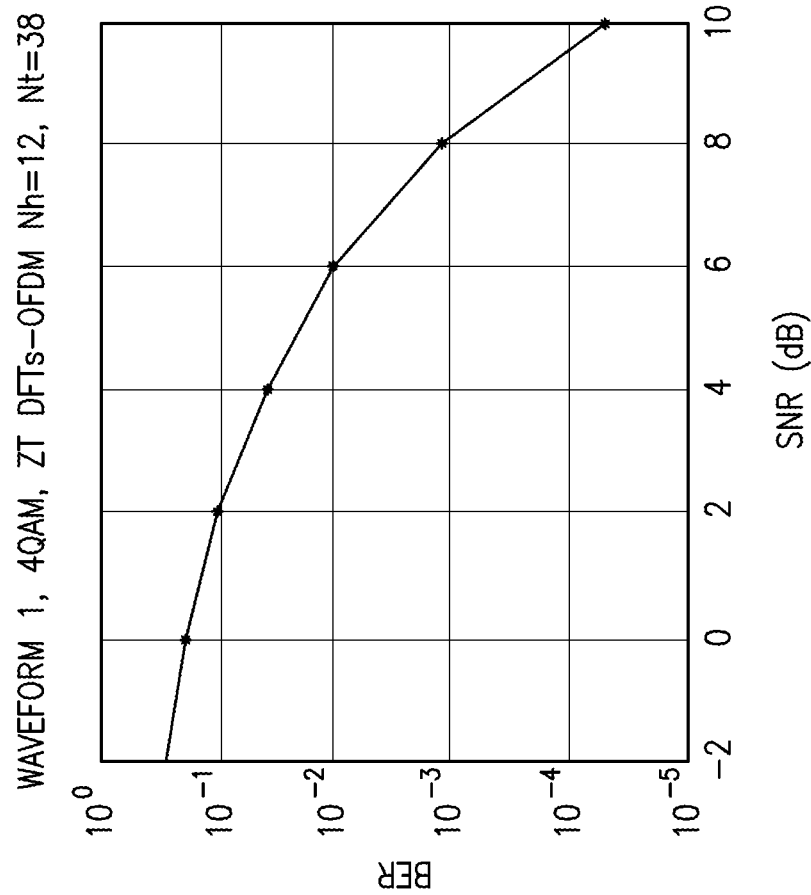
FIG. 7B shows a graph of a bit error rate (BER) performance versus signal-to-noise ratio (SNR) in dB of the first WTRU in FIG. 7A.

FIG. 7B shows a graph of a bit error rate (BER) performance versus signal-to-noise ratio (SNR) in dB of the first WTRU with waveform 701 in FIG. 7A. Despite the mismatched head/tail size parameters of the two WTRUs with waveforms 701 and 702, the signals for each WTRU may be detected without any ISI.

In an example, a WTRU may be configured semi-statically through Radio Resource Control (RRC) signaling to use universal zero head and tail size ($N_h, N_t$) parameters for demodulating and decoding of its entire payload across the frequency (sub)band. In another example, a WTRU may be configured dynamically through L1 control signaling to determine the zero head and tail size ($N_h, N_t$) parameters for demodulation and decoding of its payload.

Figure 8:
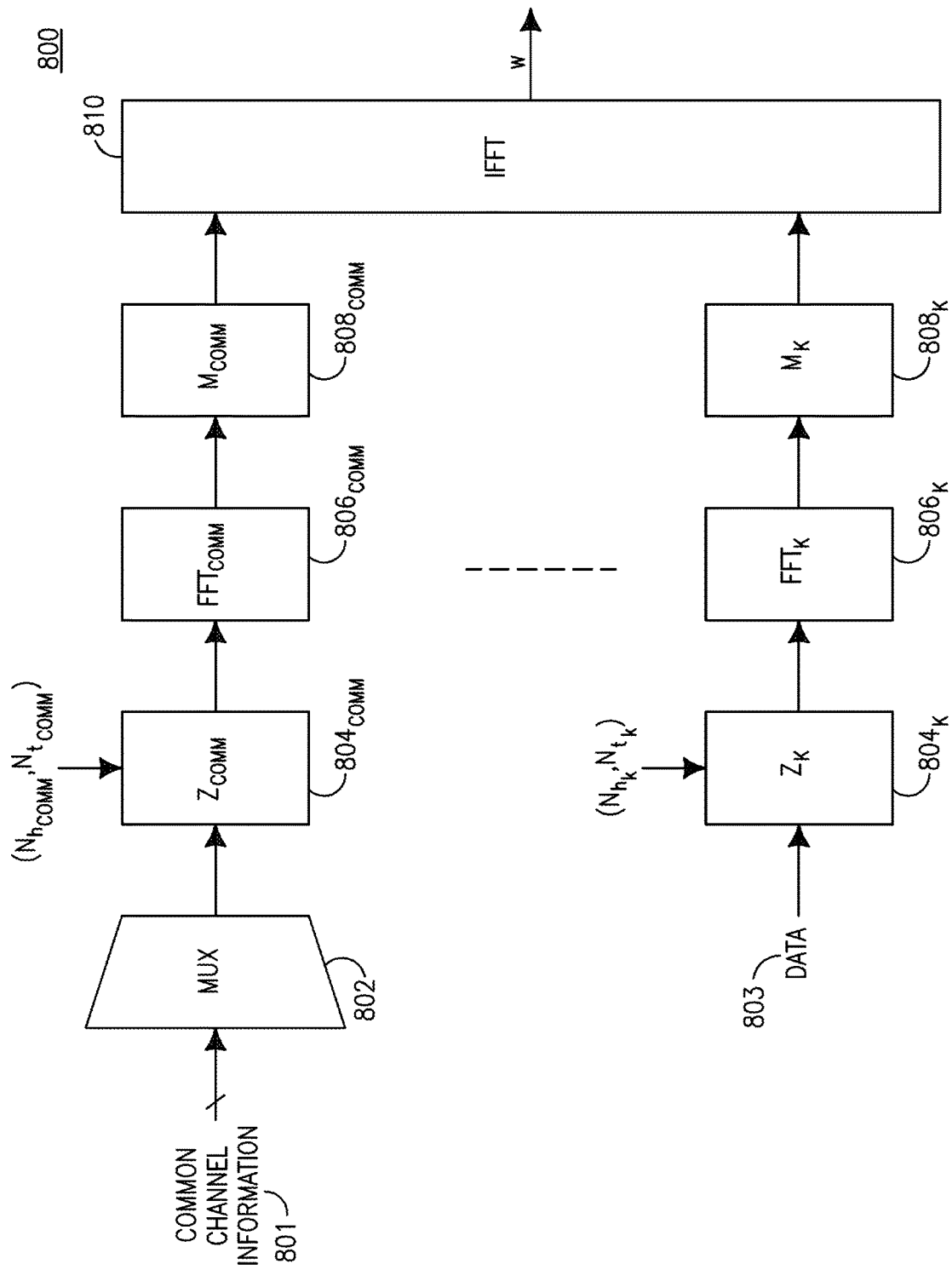
FIG. 8 shows a block diagram of an example multi-Length ZT DFT-s-OFDM system for generating common channel(s) transmissions.

In another example, a common channel scheme may be implemented where common channels may be inserted in a subframe of a ZT DFT-s-OFDM transmission. FIG. 8 shows a block diagram of an example multi-Length ZT DFT-s-OFDM system 800 for generating common channel(s) transmissions. The example system 800 inserts common channel information 801 from common channels into a subframe of a ZT DFT-s-OFDM transmission signal w. Common channels may include one channel or a combination of several channels.

The example system 800 may include, but is not limited to include, any of the following elements (where K is the number of users): a multiplexer 802; a common channel zero-padding ($Z_{comm}$) block $804_{comm}$ using zero head and tail parameters ($N_{h_{comm}}, N_{t_{comm}}$); a common channel FFT ($FFT_{comm}$) block $806_{comm}$; a common channel resource mapping ($M_{comm}$) block $808_{comm}$; zero-padding ($Z_1 \ldots Z_K$) blocks $804_1 \ldots 804_K$ using zero head and tail parameters ($N_{h_i}, N_{t_i}$) for $1 \leq i \leq K$, respectively; FFT ($FFT_1 \ldots FFT_K$) blocks $806_1 \ldots 806_K$; resource mapping ($M_1 \ldots M_K$) blocks $808_1 \ldots 808_K$; and/or an IFFT block 810.

The example system of 800 functions similarly to the example system 600 in FIG. 6, but further includes a multiplexer 802 that may assemble common channel information 801 from a combination of one or more common channels for transmission. The combination of common channels may include all common channels or a subset of common channels. Examples of common channel information 801 may include, but are not limited to, any of the following information or content: broadcast information such as broadcast reference signals; synchronization information; and/or common pilots for channel measurements and/or positioning.

Transmission of common channel information 801 may need to be configured such that the common channel information 801 in the transmitted signals w is accessible for all WTRUs across the allocated channel bandwidth. Hence, the common channel information 801 may be mapped in the zero padding block $804_{comm}$ using specific zero head and tail sizes ($N_{h_{comm}}, N_{t_{comm}}$) that are long enough in size to satisfy the channel delay profiles for all WTRUs (users) in the cell.

The common channel information 801 (e.g. a synchronization or a common reference channel) may be supported by mapping a sequence (e.g., a sequence, not shown, that may be input to multiplexer 802) with good correlation properties to assist in synchronization acquisition and/or channel estimation. Examples of sequences with good correlation properties include, but are not limited to, the following sequences: Gold sequences; and/or constant amplitude zero autocorrelation (CAZAC) sequences (e.g., Zadoff-Chu (ZC) sequence). In an embodiment, more than one synchronization and/or a common reference sequence in the common channel information 801 may be mapped to different subbands via system 800 to support different steps of a function and/or different services.

A receiving WTRU that receives the ZT DFT-s-OFDM multi-user signal w may be configured to determine the $(N_{h_{comm}}, N_{t_{comm}})$ parameters by adopting a fixed definition of the parameters, through semi-static signaling, or by blind detection. The receiving WTRU may be configured to consider $(N_{h_{comm}}, N_{t_{comm}})$ parameters for demodulating and decoding common channel information 801 in a received signal, and $(N_{h_i}, N_{t_i})$ parameters for demodulating and decoding the data payload 803 on the $i_{th}$ subband. The size of the DFT spread in the FFT block for the common channel information 801 and mapping location (defined by matrix $M_i$ in resource mapping block 808$i$ for i=1 ... K; comm) may be fixed or may be semi-statically signaled to a receiving WTRU through RRC signaling. In a configuration not shown in FIG. 8, each common channel included in the common channel information 801 may have a different set of $(N_{h_{comm}}, N_{t_{comm}})$ parameters.

Figure 9:
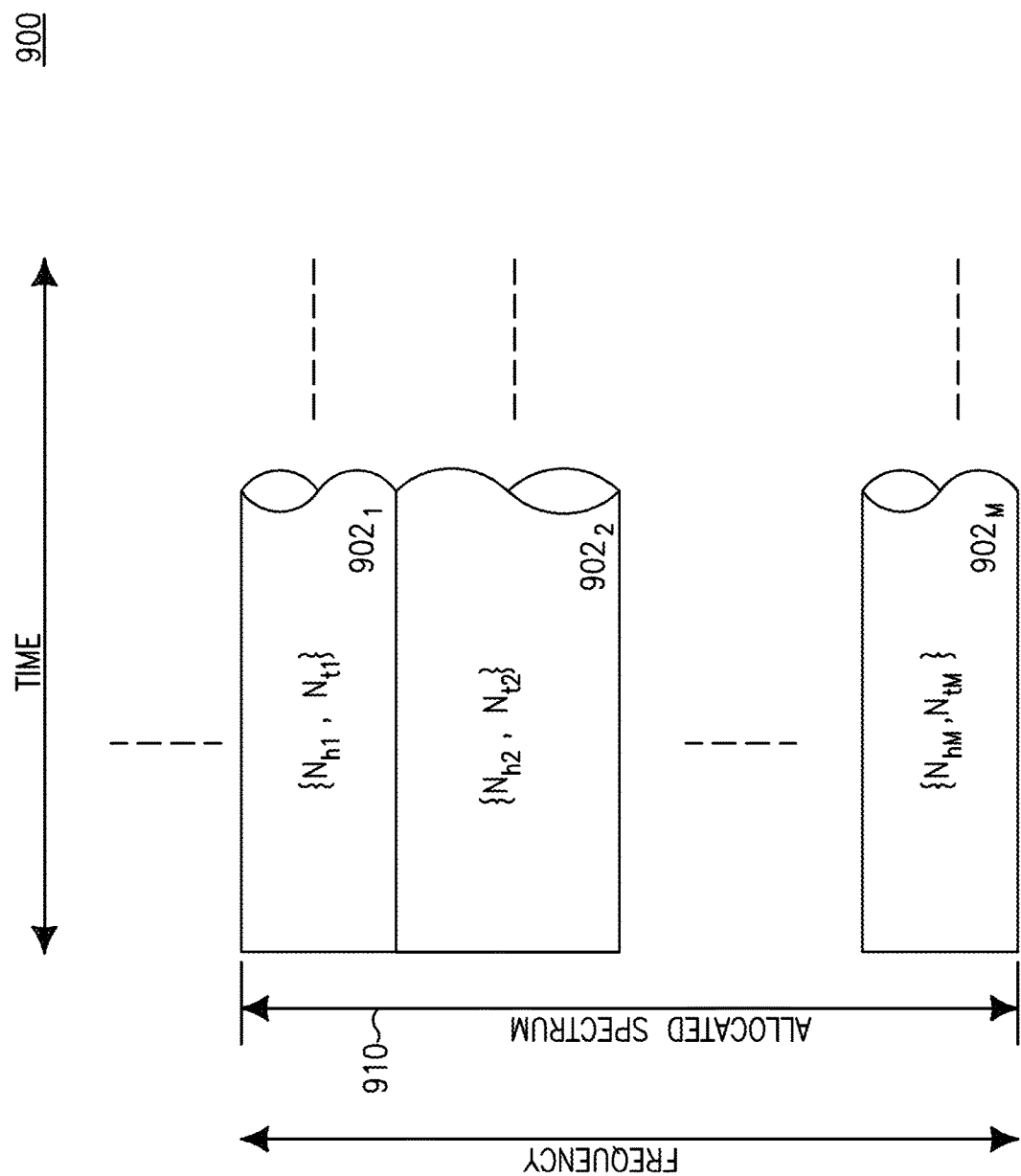
FIG. 9 shows an assignment diagram of an example frequency resource assignment for a multi-length ZT DFT-s-OFDM signal.

Example techniques may be used for assigning frequency/time resource multi-length ZT DFT-s-OFDM signals. FIG. 9 shows an assignment diagram of an example frequency resource assignment 900 for a multi-length ZT DFT-s-OFDM signal. The frequency resource assignment 900 may be based on a delay profile. In an example, a fixed frequency resource assignment (allocated spectrum) 910 may be used. With a fixed frequency resource assignment 910, WTRUs may be grouped based on their delay profile, and each WTRU group may be assigned a different part of the allocated spectrum 910. In other words, the allocated band 910 may be divided among the WTRU groups. In example frequency resource assignment 900, the allocated spectrum 910 is divided into M partitions $902_1 \ldots 902_M$, and each partition $902_1 \ldots 902_M$ may be assigned a corresponding set of zero head and tail size $\{N_{h_1}, N_{t_1}\} \ldots \{N_{h_M}, N_{t_M}\}$ parameters; the head and tail size $\{N_{h_1}, N_{t_1}\} \ldots \{N_{h_M}, N_{t_M}\}$ parameters may be different. The frequency resource assignment 900 may or may not be dynamic, and may be changed semi-statically and/or through reconfiguration, for example.

FIG. 10 shows an assignment diagram of an example time-varying frequency resource assignment 1000 for a multi-length ZT DFT-s-OFDM signal. The example frequency resource assignment 1000 may be changed over time (e.g., from time slot $1004_n$ to time slot $1004_{n+1}$), such that a given set of assigned frequency resources 1010 may be (dynamically) assigned to different WTRU groups 1 ... K with different corresponding zero head and tail values $\{N_{h_k}, N_{t_k}\}$ for k=1 ... K. In the example frequency resource assignment 1000, the head/tail parameters are changed from time slot 1004 (parameter $\{N_{h_1}, N_{t_1}\}$) to time slot $1004_{n+1}$ (parameter $\{N_{h_2}, N_{t_2}\}$). In such transitions, if $N_{t_1} > N_{t_2}$, there may not be a notable ISI caused by the waveform for WTRUs in group 1 to the waveform for WTRUs in group 2, because the channel for waveform for WTRUs in group 2 may only need a tail size of $N_{t_2}$ to avoid a spill-over creation of ISI. However if $N_{t_2} > N_{t_1}$, the head size parameter for WTRU group 2 may be selected such that $N_{h_2} > N_{t_2} - N_{t_1}$ in order to prevent spill-over from the waveform intended for WTRUs in group 1 to waveform intended for WTRUs in group 2.

Example techniques may be used to assign inter-band and/or intra-band frequency resources for multi-length ZT DFT-s-OFDM signals. Frequency resource assignments may depend on the number of component carriers (CCs) and/or the number of frequency bands used in the system. Carrier aggregation (CA), as described for example in 3GPP LTE release 10, may allow for aggregation of multiple CCs to increase system bandwidth. The use of intra-band frequency resources may allow for aggregation of contiguous or non-contiguous CCs within the same frequency band, whereas inter-band CA may be used to aggregate non-contiguous CCs.

Figure 11A:
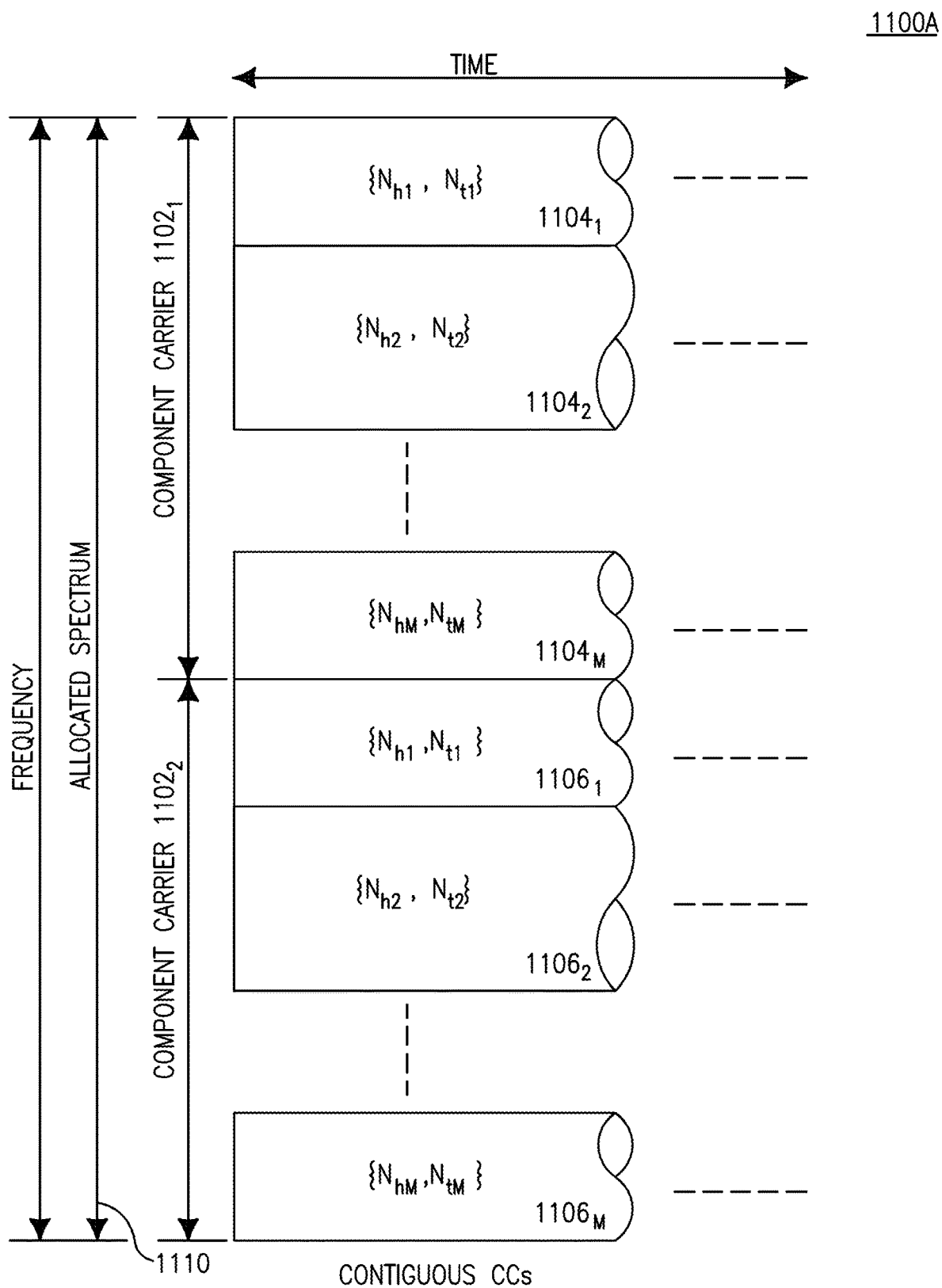
FIGS. 11A and 11B show assignment diagrams of example frequency resource assignments under carrier aggregation for a multi-length ZT DFT-s-OFDM signal.
Figure 11B:
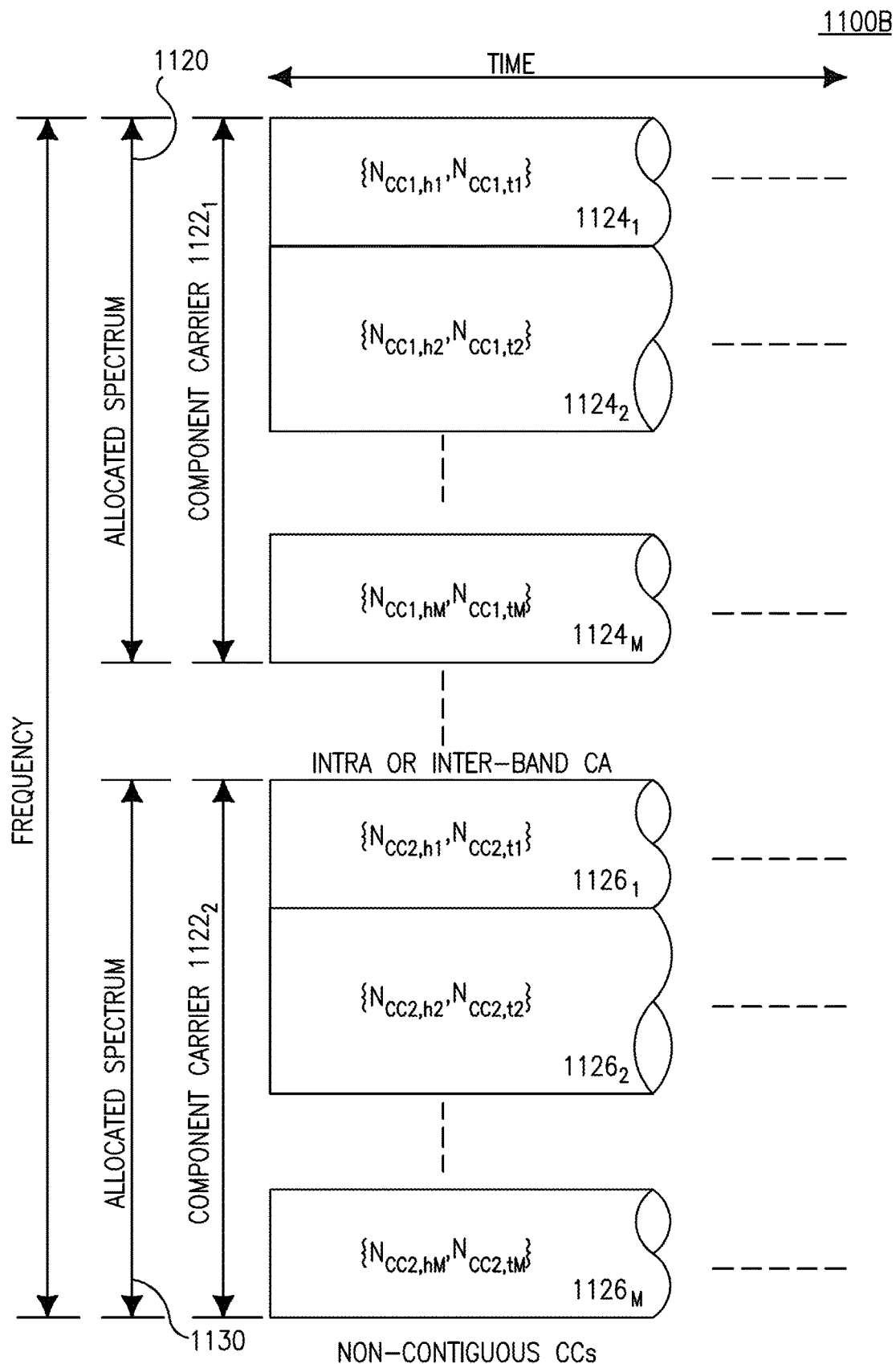

FIGS. 11A and 11B show assignment diagrams of example frequency resource assignments 1100A and 1100B, respectively, under carrier aggregation for a multi-length ZT DFT-s-OFDM signal. The example frequency resource assignments 1100A and 1100B include scenarios in which the allocated spectrum (e.g., allocated spectrum 1110 in example frequency resource assignment 1100A, and allocated spectrum 1120 and 1130 in example frequency resource assignment 1100B) consists of two CCs (e.g., CCs $1102_1$ and $1102_2$ in example frequency resource assignment 1100A, and CCs $1122_1$ and $1122_2$ in example frequency resource assignment 1100B). The example frequency resource assignment 1100A uses contiguous CCs $1102_1$ and $1102_2$ (e.g., intra-band CA). The example frequency resource assignment 1100B uses aggregation of non-contiguous CCs $1122_1$ and $1122_2$ over non-contiguous portions of allocated spectrum 1120 and 1130 (e.g., intra-band CA or inter-band CA).

In FIG. 11A, the subband frequency resource assignments 1100A may be reused across both CCs $1102_1$ and $1102_2$. For example, the zero head and tail size pair $(N_{h1}, N_{t1})$ used in subband $1104_1$ in CC $1102_1$ may be reused in subband $1106_1$ in CC $1102_2$. Similarly, zero head and tail size pair $(N_{h2}, N_{t2})$ used in subband $1104_2$ in CC $1102_1$ may be reused in subband $1106_2$ in CC $1102_2$, and $(N_{hM}, N_{tM})$ used in subband $1104_M$ in CC $1102_1$ may be reused in subband $1106_M$ in CC $1102_2$.

In FIG. 11B, the frequency resource assignment 1100B may be such that different frequency resource assignments are utilized across the two CCs $1122_1$ and $1122_2$. For example, zero head and tail size pairs $(N_{CC1,h1}, N_{CC1,t1})$, $(N_{CC1,h2}, N_{CC1,t2})$ and $(N_{CC1,hM}, N_{CC1,tM})$ may be used in subbands $1124_1$, $1124_2$, and $1124_M$ in CC $1122_1$, respectively; and different zero head and tail size pairs $(N_{CC2,h1}, N_{CC2,t1})$, $(N_{CC2,h2}, N_{CC2,t2})$ and $(N_{CC2,hM}, N_{CC2,tM})$ may be used in subbands $1126_1$, $1126_2$, and $1126_M$ in CC $1122_2$, respectively. The use of different resource requirements across different CCs (such as the example in FIG. 11B) may be used in scenarios with contiguous and/or non-contiguous CCs. However, the use of different frequency resource assignments across different CCs may be more pertinent to the inter-band CA case, because CCs in the same frequency band may exhibit similar delay spread characteristics. In addition, the added complexity of utilizing zero head and tail $(N_h, N_t)$ parameters specific to each CC (and/or subband) may not be justifiable in terms of observed performance improvements.

In an example, a WTRU may be configured to use different $(N_{l,h\_i}, N_{l,t\_i})$ parameters for demodulation and decoding of its (data) payload transmitted on the $i_{th}$ subband in the $l_{th}$ CC in the same frequency band. In another example, a WTRU may be configured to use different ($N_{q,h\_i}$, $N_{q,t\_i}$) parameters for demodulation and decoding of its (data) payload transmitted on the $i_{th}$ subband for all CCs in the $q_{th}$ frequency band. In another example, a WTRU may be configured to use different ($N_{q,l,h\_i}$, $N_{q,l,t\_i}$) parameters for demodulation and decoding of its (data) payload transmitted on the $i_{th}$ subband in the $l_{th}$ CC in the $q_{th}$ frequency band.

Example techniques may be used to assign interfrequency resources for ZT DFT-s-OFDM signals under multiple or changing transmission points (TPs). In an example, a WTRU's frequency resource assignment may remain unchanged under schemes where the TPs may change. Coordinated Multipoint (CoMP), for example as defined in 3GPP LTE Release 11, is an example technique aimed at improving cell edge performance by coordinating transmission signals from multiple transmission points so as to minimize interference. In DL CoMP, a number of TPs may coordinate their transmissions. Some of the properties of coordinating TPs for a (receiving) WTRU may include, but are not limited to include, any of the following properties: the coordinating TPs may be co-located or non-located; the coordinating TPs may belong to the same eNB or different eNBs; and/or the coordinating TPs may encompass homogeneous and/or heterogeneous networks. Examples of DL CoMP schemes include, but are not limited to, Joint Transmission (JT) CoMP and Dynamic Point Selection (DPS).

In an example DL CoMP scheme (e.g., JP CoMP and/or DPS), DL data destined for a receiving WTRU may be available at all coordinating TPs. For example, under JT CoMP, two or more TPs may transmit in the same time and frequency resource, whereas under DPS, only one of the TPs may transmit in a particular subframe. The JT CoMP or DPS schemes may not need a cell handover, which may allow for the receiving WTRU to remain associated with its current serving cell. In this case, a WTRU may continue to use its originally configured set of zero head and tail size ($N_h$, $N_t$) parameters while benefiting from CoMP techniques.

Example techniques may be used for interference management and measurement for ZT DFT-s-OFDM waveforms. Zero samples in any part of a signal may be created at the output of an IFFT block by feeding in zeros to various inputs of an FFT (DFT) block. For example, if zeros are fed into the middle of the DFT block, zeros may be created in the middle of the time domain signal. The insertions of zeros in a time domain signal may be used for various purposes.

Figure 12:
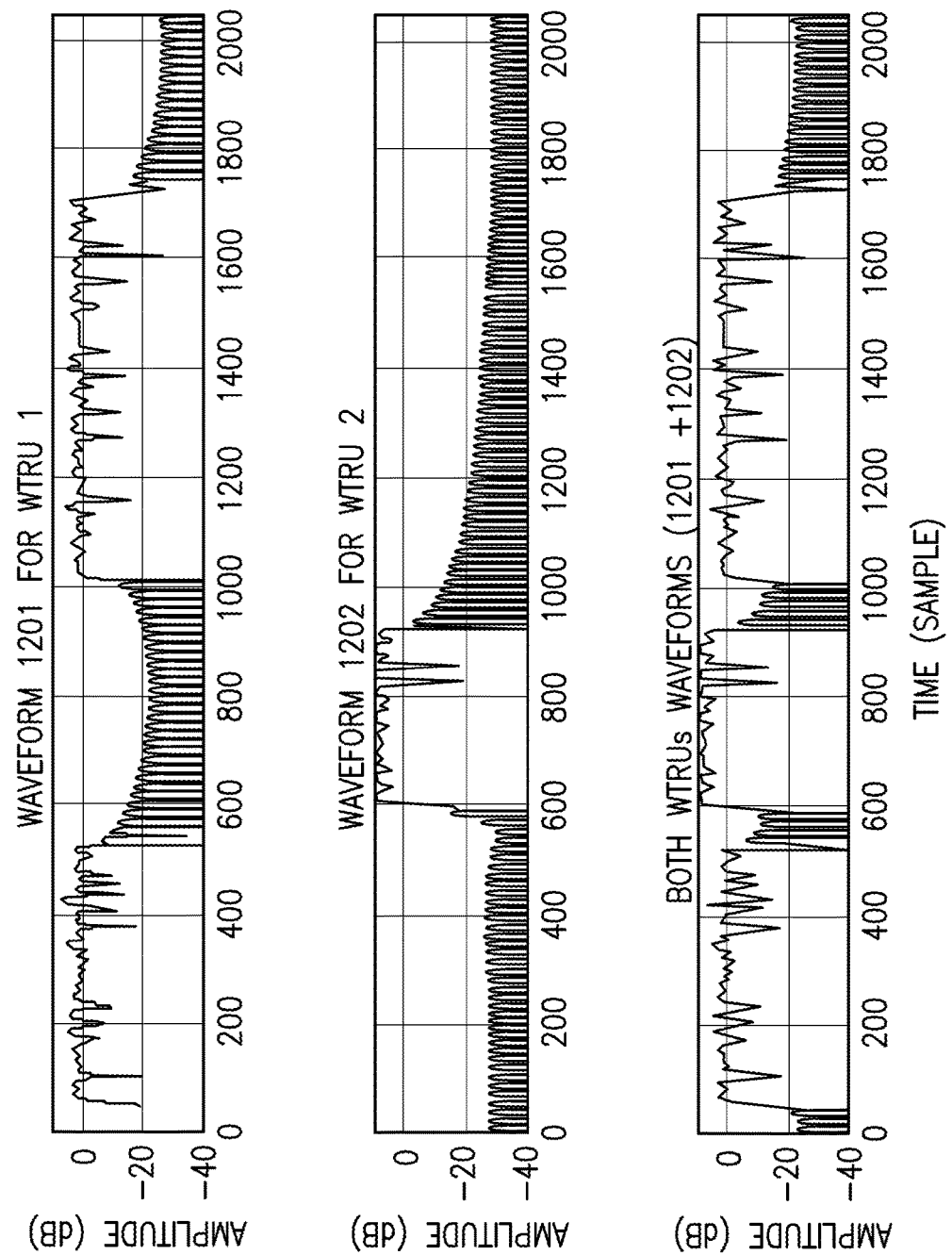
FIG. 12 shows graphs of time domain representations of ZT DFT-s-OFDM signals for two WTRUs.

For example, one application of inserting zeros in a time domain signal may be interference management within a DFT-s-OFDM symbol. In an example, two interfering transmitters may create DFT-s-OFDM signals with zeros in non-overlapping or partially overlapping samples. FIG. 12 shows graphs of time domain representations of ZT DFT-s-OFDM signals (waveforms) 1201 and 1202 for two WTRUs (users), WTRU 1 and WTRU 2. In the example of FIG. 12, WTRU 1 has inserted zeros in the middle of the DFT block, while WTRU 2 has mapped its data to the corresponding middle part of the DFT block, resulting in the two signal transmissions 1201 and 1202 coexisting without any significant mutual interference (as shown in the bottom graph of the combined waveforms 1201+1202).

Figure 13:
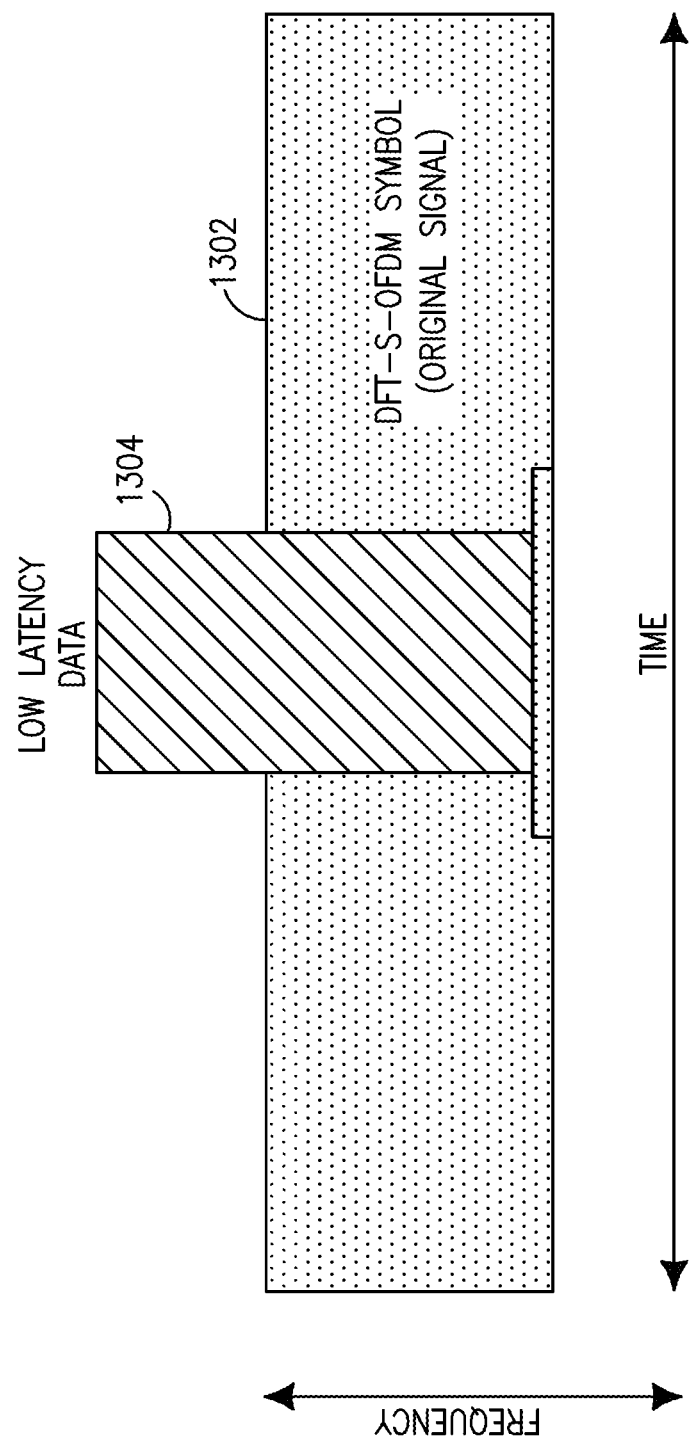
FIG. 13 shows an example assignment diagram of an example resource assignment for a ZT DFT-s-OFDM signal.

In another application of inserting zeros in a time domain signal, ultra-reliable low-latency data may be transmitted in the zeroed-out parts of another transmission signal. FIG. 13 shows an example assignment diagram of an example resource assignment 1300 for a ZT DFT-s-OFDM signal 1302. The original ZT DFT-S-OFDM signal 1302 may be assigned time-frequency resources, as shown. The transmitting WTRU may also be transmitting mobile broadband or other latency tolerant data by using the ZT DFT-s-OFDM waveform (signal) 1302. If low latency data arrives and has to be transmitted with minimal delay, the transmitting WTRU may insert zeros in the original ZT DFT-s-OFDM signal 1302 and then map another signal 1304 carrying the low latency data into the zero portion of the original signal 1302.

In an example, a ZT DFT-s-OFDM waveform, such as ZT DFT-s-OFDM waveform 1302 in FIG. 13, may be zeroed-out at different instances during a symbol time to allow interference measurements and other channel measurements. For example, a WTRU (or a group of WTRUs) may be configured to zero-out its transmission in a certain part(s) of the symbol time to allow simultaneous measurement of the channel by another set of WTRUs.

Techniques may be used to determine head and tail zero length in a multi-user system using ZT DFT-s-OFDM transmissions. In a DL multi-user ZT DFT-s-OFDM system, each WTRU may be assigned with a different set of zero head and tail sizes $N_h$ and $N_t$ parameters. Example approaches may be used by WTRUs to determine the parameters $N_h$ and $N_t$.

In an example, the $N_h$ and $N_t$ parameters may be determined by receiving WTRUs via direct signaling. For example, signaling with a WTRU group may be used. In this example, in a given cell, rather than or in addition to individual signaling to each WTRU, WTRUs may be grouped according to some criteria such as their channel delay profile, service, and/or application. Each WTRU group may be advised to use specific $N_h$ and $N_t$ parameters via explicit signaling. In another example, each WTRU may first determine its group association through L1 control signaling. Based on its group association, the WTRU may then determine ($N_h$, $N_t$) parameters associated to the group via explicit signaling.

Implied signaling may be used in another example approach used by WTRUs to determine the parameters $N_h$ and $N_t$. In an example, in a system with a fixed resource assignment, information such as parameters $N_h$ and $N_t$ may be implied through a scheduling assignment. The WTRU may first determine its resource assignment through L1 control signaling. Based on its resource assignment, the WTRU may then determine the ($N_h$, $N_t$) parameters associated with each resource assignment.

Figure 14:
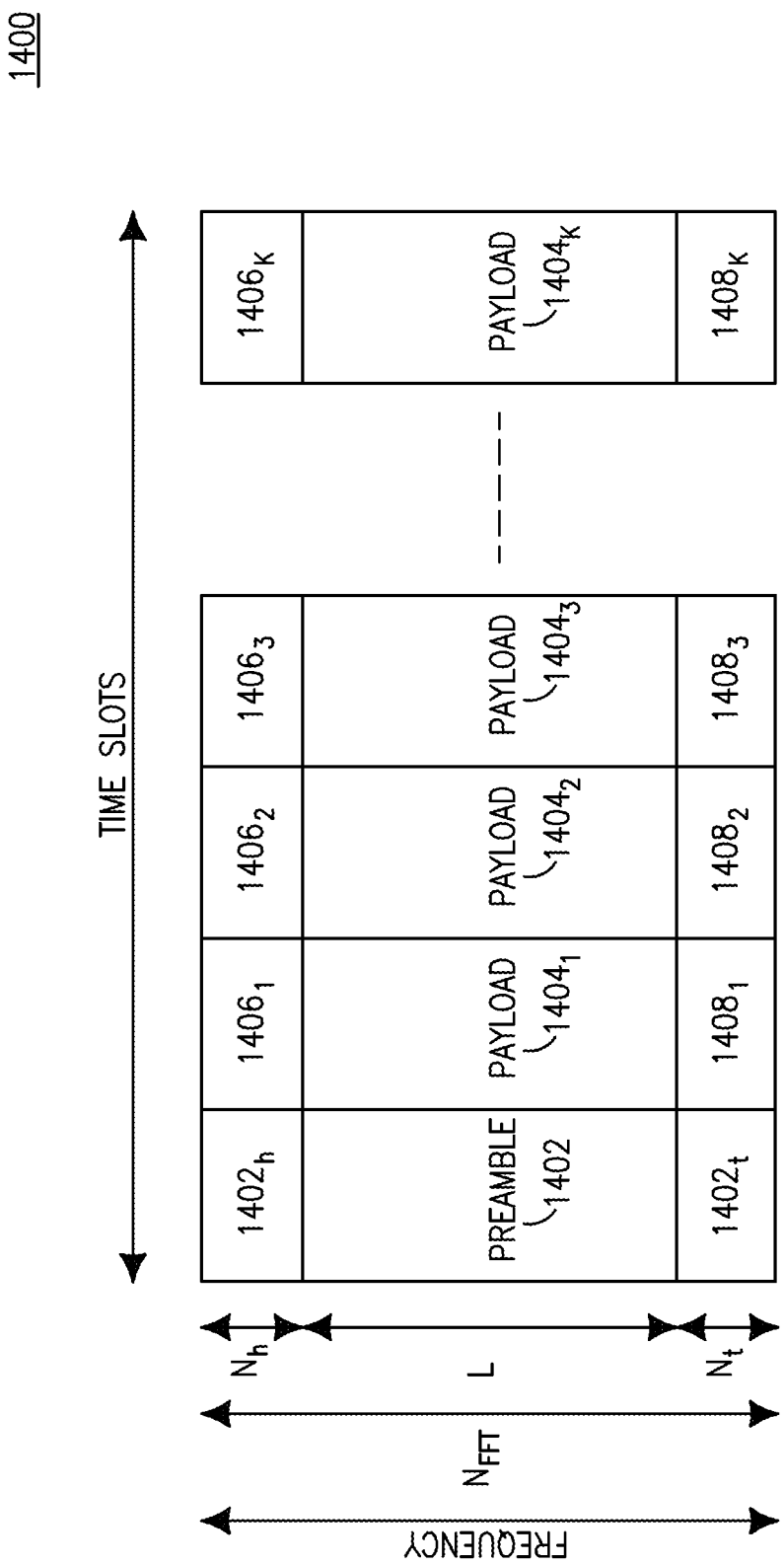
FIG. 14 shows an assignment diagram of an example preamble assignment that may be used by a receiving WTRU to detect the zero head and tail size parameters.

In another example, zero head/tail lengths (sizes) used in a multi-user system may be determined at receiving WTRU(s) using sequences with good correlation properties. FIG. 14 shows an assignment diagram of an example preamble assignment 1400 that may be used by a receiving WTRU to detect the $N_h$ and $N_t$ parameters. The example preamble assignment 1400 shows how different parts of a ZT-s OFDM signal may be located in frequency over time (time slots).

In the example preamble assignment 1400, head zeroes may be placed in portions of the frequency band $1402_h$, and $1406_1 \ldots 1406_K$, and tail zeroes may be placed in portions of the frequency band $1402_t$, $1408_1 \ldots 1408_K$. The payload information may be placed in portions of the frequency band 1402, $1404_1 \ldots 1404_K$, and in this example a preamble may be placed in the first time slot or symbol 1402.

In order to assist a receiving WTRU in detecting the head/tail parameters $N_h$ and $N_t$ used for a DL (or UL) transmission, a pre-known sequence with good correlation properties, such as Zadoff-Chu (CAZAC) sequence or m-sequence, may be mapped to the very first transmitted signals. This may help determine the zero padding size and provide the information for demodulation of the subsequent symbols in the subframe.

At the receiving WTRU, after the initial processing of the received estimated sequence $\hat{s}_k$:

$$\hat{s}_k = F_{N_{FFT_k}}^{-1} M_k^T F_{N_{IFFT}} w,$$ Equation (22)

The WTRU may correlate the estimated sequence $\hat{s}_k$ against the set of pre-known sequences to determine the assigned $N_h$ and $N_t$ parameter sizes. A WTRU may perform blind detection of the padding parameters by examining the pre-defined sequences. In other words, when a tail and/or header size changes, different sequences (or variations of the same sequence) may be used to indicate the tail and/or header size.

Figure 15:
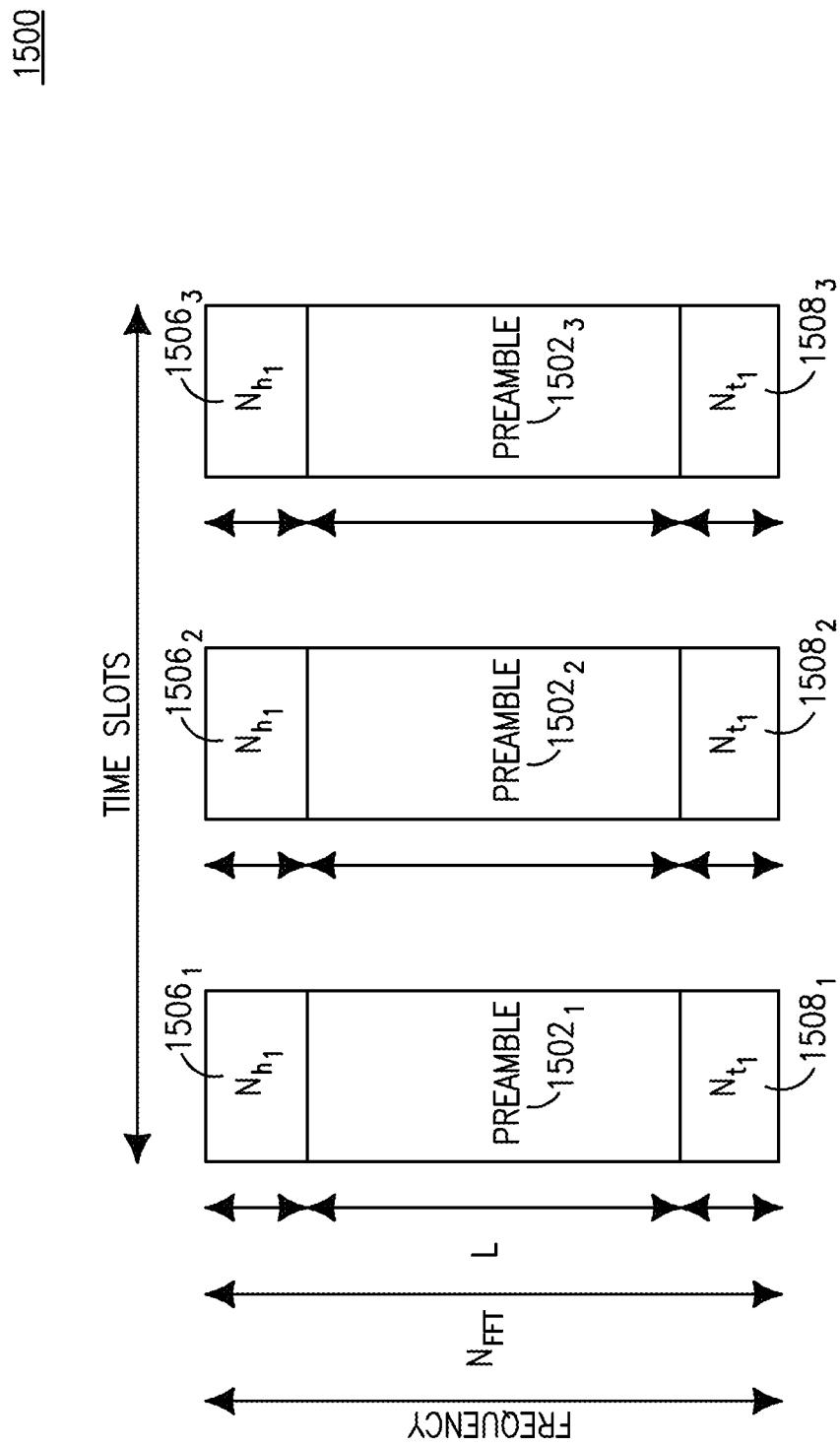
FIG. 15 shows an assignment diagram of another example preamble assignment that may be used by a receiving WTRU to detect the zero head and tail size parameters.

FIG. 15 shows an assignment diagram of an example preamble assignment 1500 that may be used by a receiving WTRU to detect the $N_h$ and $N_t$ parameters. The example preamble assignment 1500 includes a combination set for zero head and tail parameters $\{N_{h_1}, N_{t_1}\}$, $\{N_{h_2}, N_{t_2}\}$ and $\{N_{h_3}, N_{t_3}\}$. To simplify the correlation process, the WTRU may consider only a few combinations for $N_h$ and $N_t$ (e.g., two or three combinations) to reduce the processing load. In the example preamble assignment 1500, head zeroes may be placed in portions of the frequency band $1506_1 \ldots 1506_3$, and tail zeroes may be placed in portions of the frequency band $1508_1 \ldots 1408_3$. The payload information (e.g., preamble information) may be placed in portions of the frequency band $1502_1 \ldots 1502_3$.

In this example, both parameters $N_h$ and $N_t$ may be determined in a one-step correlation at a receiving WTRU. To further facilitate the correlation process, it may be assumed that all WTRUs have the same zero head size $N_h$ but different zero tail sizes $N_t$. In an example, the allowed set of $N_h$ and $N_t$ parameters may be fixed. In another example, the receiving WTRU may determine the entire set or a sub-set of $N_h$ and $N_t$ parameters from semi-static signaling.

In another technique to determine head and tail zero length in a multi-user system using ZT DFT-s-OFDM transmissions, different modulation types may be used. For example, in order to indicate the zero head and tail sizes $N_h$ and $N_t$, a transmitting WTRU may use different types of modulation orders, such as the use of binary phase-shift keying (BPSK) modulation when $N_t$=64 and $$\frac{\pi}{2} - BPSK$$

when $N_t$=32. The receiving WTRU may detect the modulation type blindly in order to determine the zero head and tail sizes $N_h$ and $N_t$.

Figure 16:
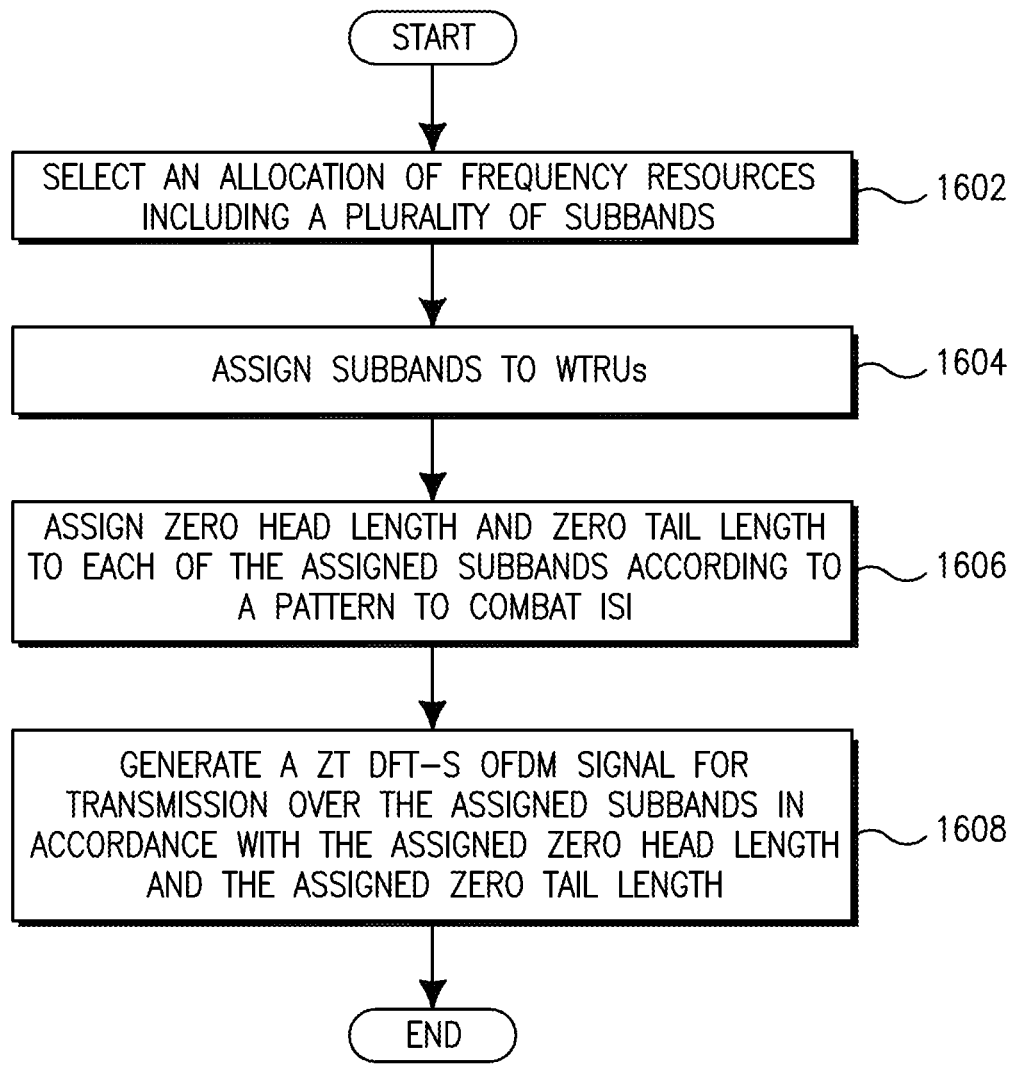
FIG. 16 shows a flow diagram of an example procedure for generating a multi-length ZT DFT-s-OFDM signal for transmission.

FIG. 16 shows a flow diagram of an example procedure 1600 for generating a multi-length ZT DFT-s-OFDM signal for transmission. The procedure 1600 may be performed by a transmitting device, such as any WTRU, a base station, or an eNodeB, for example. At 1602, the transmitting device may select (or receive) an allocation of frequency resources, which MAY include a plurality of subbands. At 1604, the transmitting device may assign subbands to (receiving) WTRUs (i.e., users). At 1606, the transmitting device may assign zero head length and zero tail length to each of the assigned subbands according to a pattern to combat ISI. At 1608, the transmitting device may generate a ZT DFT-s OFDM signal for transmission over the assigned subbands in accordance with the assigned zero head length and the assigned zero tail length.

Although features and elements are described above in particular combinations, one of ordinary skill in the art will appreciate that each feature or element may be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media.

Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method performed by a network device, the method comprising:
    selecting, by the network device, an allocation of frequency resources for transmission, wherein the allocated frequency resources include a plurality of sub-bands;
    assigning, by the network device, one or more of the plurality of sub-bands to each of a plurality of wireless transmit/receive units (WTRUs);
    assigning, by the network device, a zero head length and a zero tail length to each of the assigned one or more of the plurality of sub-bands based on one or more patterns;
    generating, by the network device, a multi-length zero tail (ZT) discrete Fourier transform-spread orthogonal frequency division multiplexing (DFT-s-OFDM) signal for the assigned one or more of the plurality of sub-bands with a zero head based on the assigned zero head length and a zero tail based on the assigned zero tail length; and
    transmitting, by the network device, the multi-length ZT DFT-s OFDM signal.

2. The method of claim 1, wherein the one or more patterns include increasing or decreasing the zero head length and the zero tail length between adjacent sub-bands.

3. The method of claim 1, wherein:
    the assigning of the one or more of the plurality of sub-bands to each of the plurality of WTRUs includes assigning adjacent sub-bands to WTRUs with a same channel delay profile.

4. The method of claim 1, wherein:
    the assigning the zero head length and the zero tail length to each of the assigned one or more of the plurality of sub-bands is repeated at each time slot, within an allocated time period, such that the assigned zero head length and the assigned zero tail length to a first assigned sub-band in a first time slot is different than in a second time slot immediately following the first time slot.

5. The method of claim 1, further comprising:
    applying, by the network device, a pre-known sequence with a correlation property to a first generated ZT DFT-s OFDM signal for transmission so that a receiving WTRU may determine the zero head length and the zero tail length.

6. The method of claim 1, wherein:
the generating the multi-length ZT DFT-s OFDM signal includes inserting zeros into a time domain to generate a zeroed-out portion of the multi-length ZT DFT-s OFDM signal.

7. The method of claim 6 further comprising:
inserting, by the network device, ultra-reliable low-latency data into the zeroed-out portion of the multi-length ZT DFT-s OFDM signal.

8. The method of claim 6, wherein one or more measurements are performed during the zeroed-out portion of the multi-length ZT DFT-s OFDM signal.

9. A network device comprising:
a transceiver coupled to a processor and at least one antenna; and
the processor is configured to:
  select an allocation of frequency resources for transmission, wherein the allocated frequency resources include a plurality of sub-bands;
  assign one or more of the plurality of sub-bands to each of a plurality of wireless transmit/receive units (WTRUs);
  assign a zero head length and a zero tail length to each of the assigned one or more of the plurality of sub-bands based on one or more patterns; and
  generate a multi-length zero tail (ZT) discrete Fourier transform-spread orthogonal frequency division multiplexing (DFT-s-OFDM) signal for the assigned one or more of the plurality of sub-bands with a zero head based on the assigned zero head length and a zero tail based on the assigned zero tail length;
the transceiver configured to transmit the multi-length ZT DFT-s OFDM signal.

10. The network device of claim 9, wherein the one or more patterns include increasing or decreasing the zero head length and the zero tail length between adjacent sub-bands.

11. The network device of claim 9, wherein:
the processor is configured to assign the one or more of the plurality of sub-bands to each of the plurality of WTRUs includes assigning adjacent sub-bands to WTRUs with a same channel delay profile.

12. The network device of claim 9, wherein:
the processor is further configured to assign the zero head length and the zero tail length to each of the assigned one or more of the plurality of sub-bands is repeated at each time slot, within an allocated time period, such that the assigned zero head length and the assigned zero tail length to a first assigned sub-band in a first time slot is different than in a second time slot immediately following the first time slot.

13. The network device of claim 9, wherein:
the processor is configured to apply a pre-known sequence with a correlation property to a first generated ZT DFT-s OFDM signal for transmission so that a receiving WTRU may determine the zero head length and the zero tail length.

14. The network device of claim 9, wherein:
the processor is further configured to generate the multi-length ZT DFT-s OFDM signal by inserting zeros into a time domain to generate a zeroed-out portion of the multi-length ZT DFT-s OFDM signal.

15. The network device of claim 14, wherein:
the processor is configured to insert ultra-reliable low-latency data into the zeroed-out portion of the multi-length ZT DFT-s OFDM signal.

16. The network device of claim 14, wherein one or more measurements are performed during the zeroed-out portion of the multi-length ZT DFT-s OFDM signal.

17. A wireless transmit/receive unit (WTRU) comprising:
a transceiver coupled to a processor and at least one antenna;
the transceiver and the processor are configured to receive a multi-length zero tail (ZT) discrete Fourier transform-spread orthogonal frequency division multiplexing (DFT-s-OFDM) signal; and
wherein the multi-length ZT DFT-s-OFDM signal is composed of one or more of a plurality of sub-bands assigned to the WTRU and is composed of a zero head and a zero tail for each of the assigned one or more of the plurality of sub-bands based on one or more patterns.

18. The WTRU of claim 17, wherein the one or more patterns include increasing or decreasing the length between adjacent sub-bands.

* * * * *